United States Patent
Yoshino et al.

(10) Patent No.: US 9,260,116 B2
(45) Date of Patent: Feb. 16, 2016

(54) DRIVE FORCE CONTROL DEVICE FOR VEHICLE

(71) Applicant: NISSAN MOTOR CO., LTD., Yokohama-shi, Kanagawa (JP)

(72) Inventors: Takahiro Yoshino, Kanagawa (JP); Masahiro Iriyama, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/406,619

(22) PCT Filed: Jun. 13, 2013

(86) PCT No.: PCT/JP2013/066308
§ 371 (c)(1),
(2) Date: Dec. 9, 2014

(87) PCT Pub. No.: WO2013/187464
PCT Pub. Date: Dec. 19, 2013

(65) Prior Publication Data
US 2015/0151758 A1    Jun. 4, 2015

(30) Foreign Application Priority Data

Jun. 13, 2012 (JP) ................................. 2012-134052

(51) Int. Cl.
*B60W 10/10* (2012.01)
*B60W 10/06* (2006.01)
(Continued)

(52) U.S. Cl.
CPC ............. *B60W 30/188* (2013.01); *B60W 10/04* (2013.01); *B60W 10/06* (2013.01); *B60W 10/101* (2013.01); *B60W 10/107* (2013.01); *B60W 10/108* (2013.01); *B60W 30/1882* (2013.01); *B60W 50/082* (2013.01); *F02D 11/106* (2013.01);
(Continued)

(58) Field of Classification Search
CPC ............ B60W 10/101; B60W 10/107; B60W 2510/0604; B60W 2710/1005
See application file for complete search history.

(56) References Cited

U.S. PATENT DOCUMENTS

| | | | | |
|---|---|---|---|---|
| 6,345,221 B2* | 2/2002 | Hattori | ................... | B60K 17/04 123/319 |
| 6,502,474 B2* | 1/2003 | Sakamoto | ................ | B60K 6/48 477/181 |

(Continued)

FOREIGN PATENT DOCUMENTS

| | | |
|---|---|---|
| JP | 11-348606 A | 12/1999 |
| JP | 2001-206106 A | 7/2001 |

(Continued)

*Primary Examiner* — Robert Hodge
*Assistant Examiner* — Tinh Dang
(74) *Attorney, Agent, or Firm* — Drinker Biddle & Reath LLP

(57) ABSTRACT

A target drive force is computed according to an accelerator pedal opening. A target input rotation speed lower limit basic value to an automatic transmission is computed based on a vehicle speed and a shift range of the automatic transmission. A target drive force lower limit correction value is computed based on the target input rotation speed lower limit basic value. The target drive force is corrected based on the target drive force lower limit correction value. A target input torque of the automatic transmission is computed based on the target drive force after correction. An input torque to the automatic transmission is controlled to the target input torque. By this control, an arbitrary drive force characteristic can be obtained in a PTD control.

10 Claims, 25 Drawing Sheets

(51) Int. Cl.
  *B60W 30/188* (2012.01)
  *F02D 11/10* (2006.01)
  *F02D 29/02* (2006.01)
  *F16H 61/02* (2006.01)
  *F16H 63/50* (2006.01)
  *B60W 10/107* (2012.01)
  *B60W 10/04* (2006.01)
  *B60W 10/101* (2012.01)
  *B60W 10/108* (2012.01)
  *F02D 29/00* (2006.01)
  *B60W 50/08* (2012.01)
  *F16H 59/18* (2006.01)

(52) U.S. Cl.
  CPC .............. *F02D 29/00* (2013.01); *F02D 29/02* (2013.01); *F16H 61/02* (2013.01); *F16H 61/0213* (2013.01); *F16H 63/50* (2013.01); *B60W 2510/0604* (2013.01); *B60W 2710/105* (2013.01); *B60W 2710/1022* (2013.01); *F02D 2200/0404* (2013.01); *F02D 2200/501* (2013.01); *F02D 2200/602* (2013.01); *F16H 59/18* (2013.01)

(56) References Cited

U.S. PATENT DOCUMENTS

| | | | |
|---|---|---|---|
| 6,823,250 B2 * | 11/2004 | Yamaguchi | B60K 6/485 701/22 |
| 2004/0236483 A1 * | 11/2004 | Kimura | B60K 6/365 701/22 |
| 2008/0119319 A1 * | 5/2008 | Kaya | B60K 6/445 477/3 |
| 2010/0029442 A1 * | 2/2010 | Ito | B60K 6/445 477/183 |

FOREIGN PATENT DOCUMENTS

| | | |
|---|---|---|
| JP | 2001-227636 A | 8/2001 |
| JP | 2001-328462 A | 11/2001 |
| JP | 2007-245897 A | 9/2007 |

* cited by examiner

DRIVE FORCE CONTROL DEVICE FOR VEHICLE

TECHNICAL FIELD

The prevent invention relates to an improvement of a powertrain torque demand control for integrally controlling a speed ratio and the operation of an internal combustion engine based on a target vehicle drive force.

BACKGROUND ART

For a drive force control for vehicle, an method has been conventionally widely adopted which controls an output of an internal combustion engine based on a depression amount of an accelerator pedal and, on the other hand, controls a speed ratio of an automatic transmission based on the depression amount of the accelerator pedal and a vehicle speed. According to this conventional method, the engine and the transmission are independently controlled according to individual target values.

In contrast, JP2001-328462A, published in 2001 by the Japan Patent Office, proposes a powertrain torque demand (PTD) control for setting a target vehicle drive force from a depression amount of an accelerator pedal and a vehicle speed and integrally controlling a speed ratio of an automatic transmission and a torque of an internal combustion engine to achieve a target vehicle drive force.

SUMMARY OF INVENTION

A speed ratio of an automatic transmission is generally determined with reference to a shift map. Specifically, the speed ratio is determined from an accelerator pedal opening and a vehicle speed.

In this case, by preparing a plurality of shift maps, the driver can select a sport mode, for example, to obtain a greater speed ratio at the same accelerator pedal opening and the same vehicle speed, thereby enhancing a response and acceleration performance of the vehicle.

In the conventional independent control, since an internal combustion engine output and a speed ratio of the automatic transmission are independently controlled, the sport mode is realized simply by switching a shift map.

However, in the PTD control, simply switching the shift map may result in a final vehicle drive force deviated from a target drive force.

It is therefore an object of this invention to realize a drive force characteristic expected for an operation of increasing an input rotation speed such as in a sport mode in a PTD control.

In order to achieve the above object, this invention provides a drive force control device for a vehicle with an automatic transmission. The drive force control device comprises a sensor that detects an accelerator pedal opening, a sensor that detects a vehicle speed and a programmable controller.

The controller is programmed as follows. Specifically, the controller is programmed to compute a target drive force according to the accelerator pedal opening, compute a target input rotation speed lower limit basic value to the automatic transmission based on the vehicle speed and a shift range of the automatic transmission, compute a target drive force lower limit correction value based on the target input rotation speed lower limit basic value, correct the target drive force based on the target drive force lower limit correction value, compute a target input torque to the automatic transmission based on the target drive force after correction and control an input torque to the automatic transmission to the target input torque.

The details as well as other features and advantages of this invention are set forth in the remainder of the specification and are shown in the accompanying drawings.

DESCRIPTION OF EMBODIMENT

Figure 1:
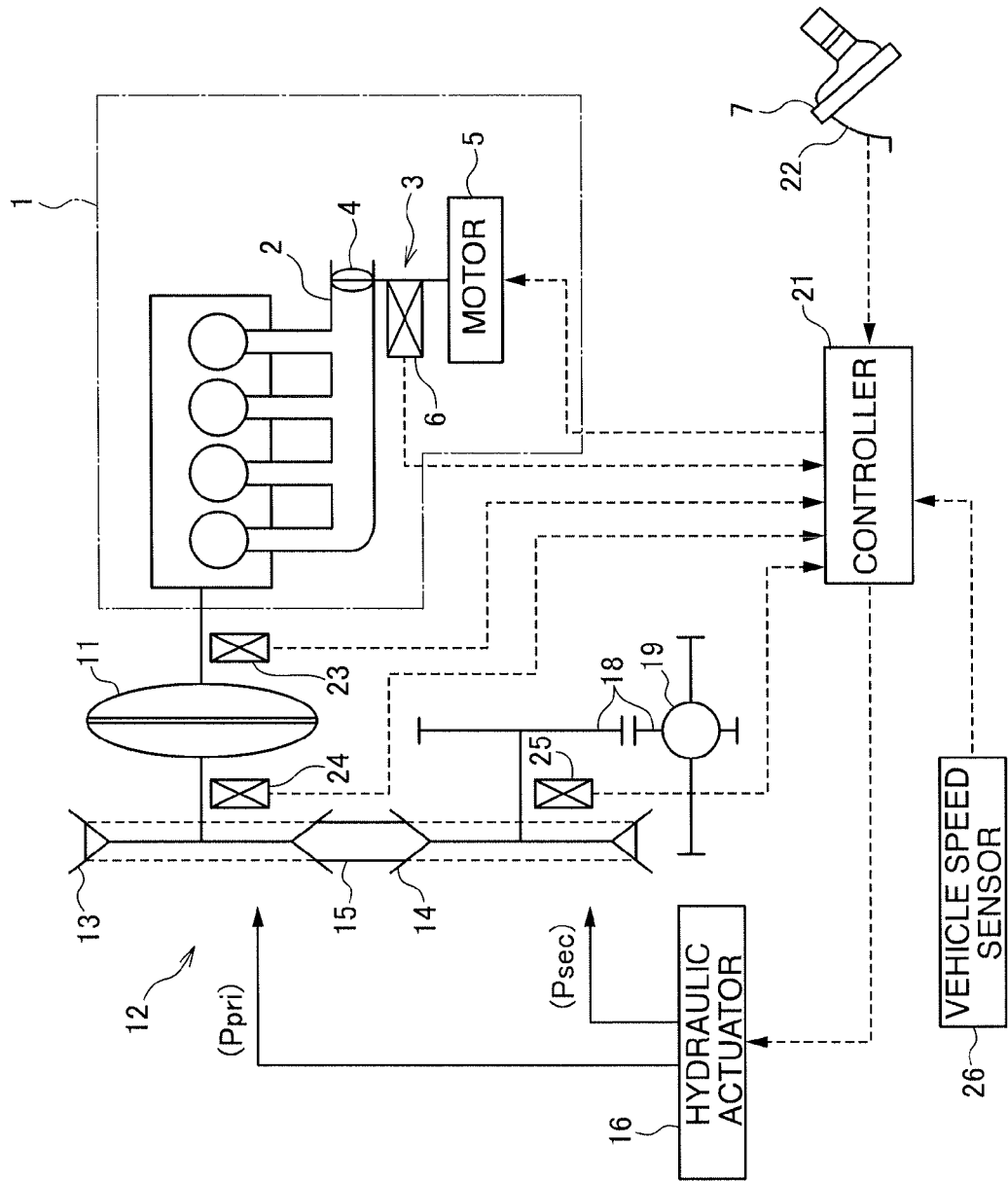
FIG. 1 is a schematic diagram of a drive force control device for a vehicle according an embodiment of this invention.

Referring to FIG. 1 of the drawings, an output of an internal combustion engine 1 of a vehicle is input into a continuously variable transmission (CVT) 12 via a torque converter 11. The continuously variable transmission comprises a primary pulley 13, a secondary pulley 14 and a V-belt 15 mounted on these pulleys. The primary pulley 13 changes a contact radius with the V-belt 15 by changing a groove width according to a hydraulic pressure Ppri. The secondary pulley 14 changes a contact radius with the V-belt 15 by changing a groove width according to a hydraulic pressure Psec. As a result, the CVT 12 continuously changes a ratio of an input rotation speed and an output rotation speed, i.e. a speed ratio according to controls of the hydraulic pressures Ppri and Psec. The hydraulic pressures Ppri and Psec are generated by a hydraulic pressure supply device 16.

The secondary pulley 14 is coupled to drive wheels via a final gear 18 and a differential 19.

The internal combustion engine 1 comprises an intake throttle device 3 for adjusting an intake air amount. The intake throttle device 3 comprises an intake throttle 4 provided in an intake passage 2 of the internal combustion engine 1 and an electric motor 5 for changing an opening of the intake throttle according to an input signal.

The hydraulic pressure supply device 16 and the intake throttle device 3 are operated according to command signals output by a controller 21.

The controller 21 is constituted by a microcomputer comprising a central processing unit (CPU), a read-only memory (ROM), a random access memory (RAM) and an input/output interface (I/O interface). The controller may also be constituted by a plurality of microcomputers.

Detection signals are input into the controller 21 from a throttle opening sensor 6 that detects a throttle opening of the intake throttle 4, an accelerator opening sensor 22 that detects an accelerator pedal opening of an accelerator pedal 7 provided in the vehicle, an engine rotation speed sensor 23 that detects a rotation speed of the internal combustion engine 1, a primary pulley rotation speed sensor 24 that detects a rotation speed of the primary pulley 13, a secondary pulley rotation speed sensor 25 that detects a rotation speed of the secondary pulley 14 and a vehicle speed sensor 26 that detects a traveling speed of the vehicle.

The controller 21 controls a vehicle drive force by executing an opening control of the intake throttle 4 and a shift control of the CVT 12 via the hydraulic pressure supply device 16 according to these detection signals.

A concept of a control executed by the drive force control device configured above will be described.

Figure 2:
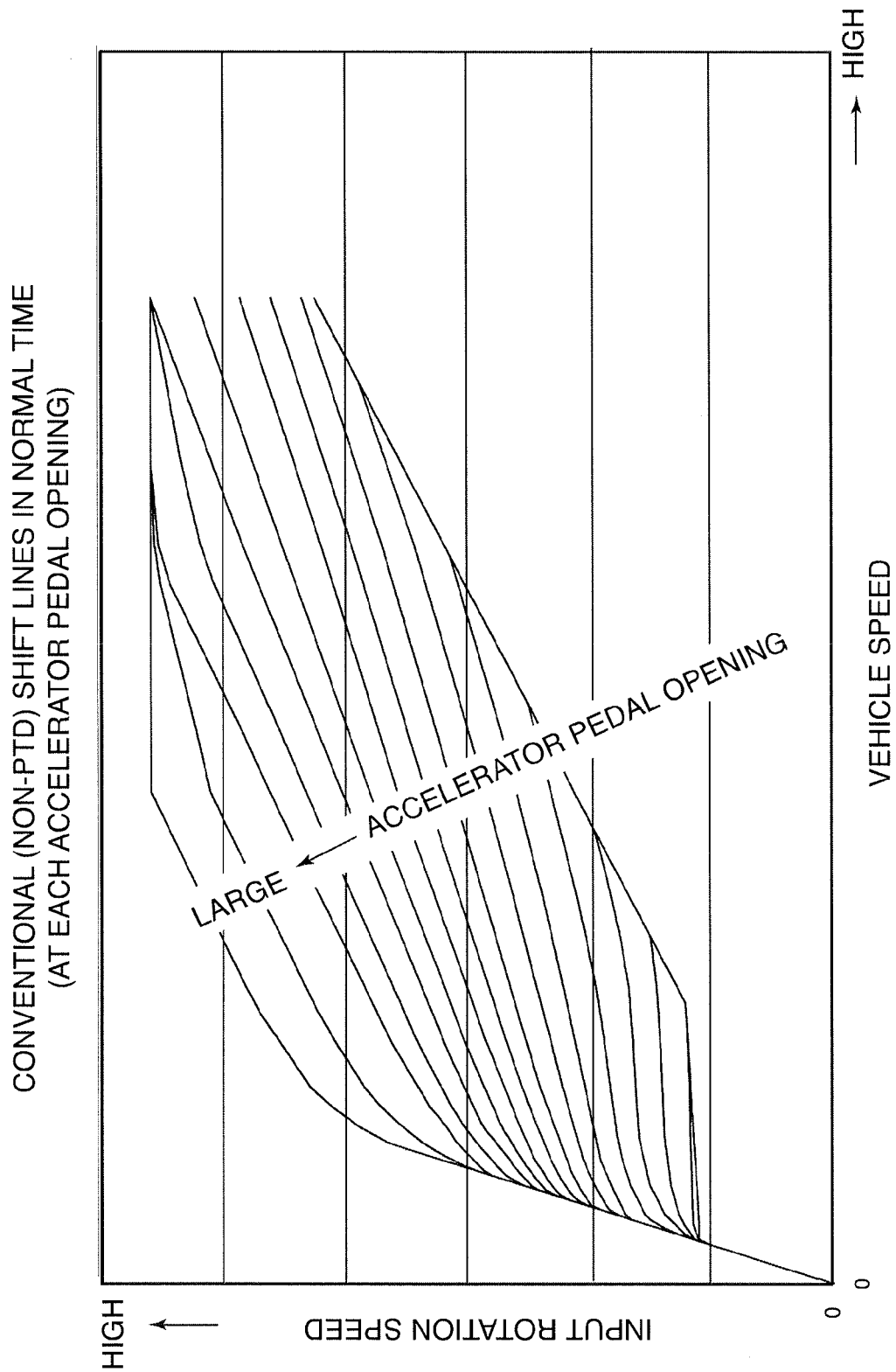
FIG. 2 is a diagram showing a relationship of a vehicle speed and an input rotation speed of an automatic transmission according to an accelerator pedal opening by an Engine Torque Demand (ETD) control that independently controls an engine and the transmission according to individual target values.

FIG. 2 shows a transmission characteristic when a driver selects a transmission characteristic of a normal mode in an ETD control. Herein, if the accelerator pedal opening is constant, the speed ratio is reduced, i.e. changes toward a high (Hi) side with an increase in the vehicle speed. Finally, the speed ratio becomes constant at a lowest speed ratio, i.e. a speed ratio on a most Hi side.

Figure 3:
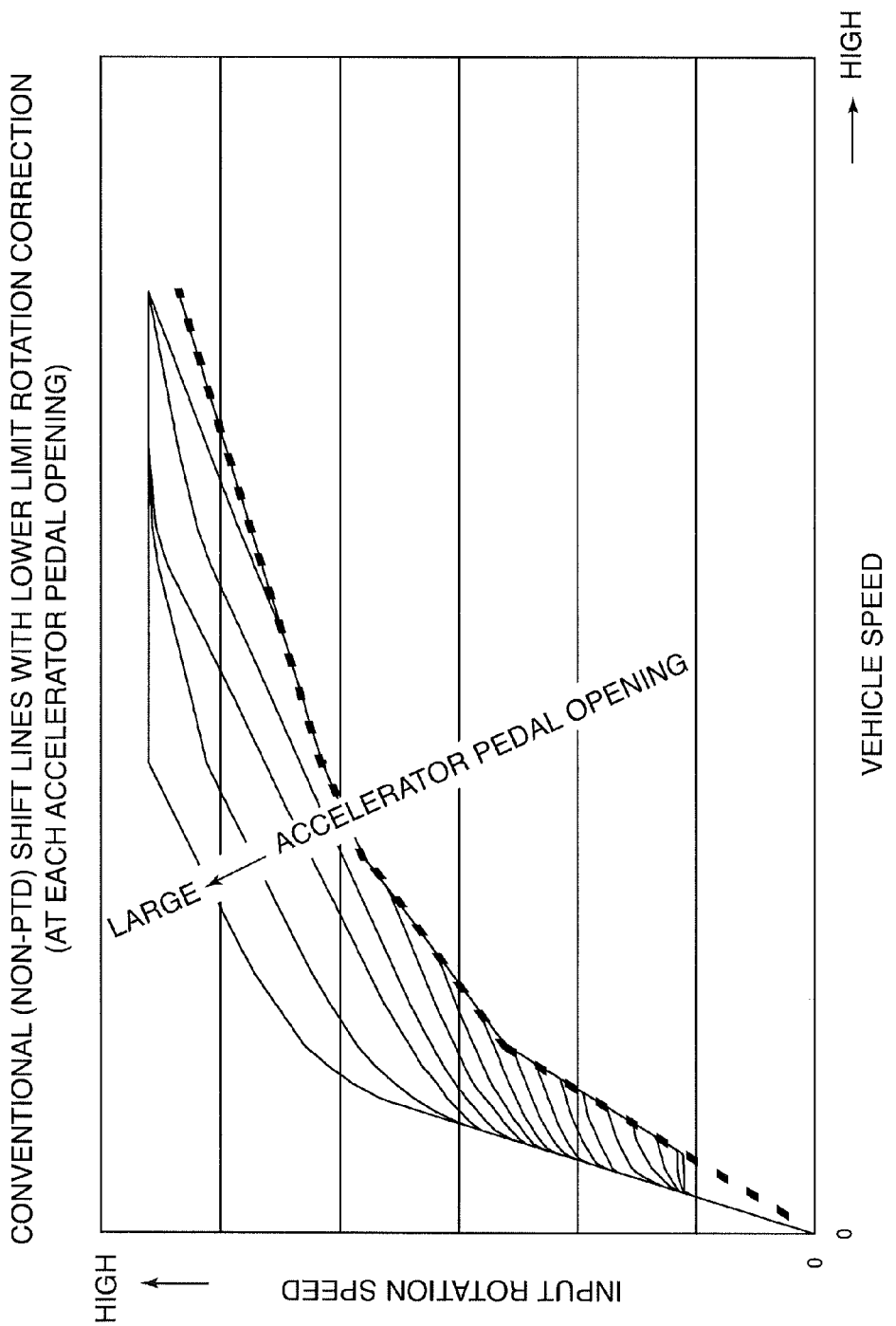
FIG. 3 is a diagram showing a high limiter by the ETD control.

FIG. 3 shows a transmission characteristic when the driver selects a transmission characteristic of a sport mode in the ETD control. Herein, as compared with the characteristic of FIG. 2, a high limiter is set on a low (Lo) side so that the speed ratio is not shifted up to the speed ratio on the most Hi side, and the transmission characteristic is so set that the input rotation speed is higher in many regions than in the normal mode if the vehicle speed is the same.

Figure 4:
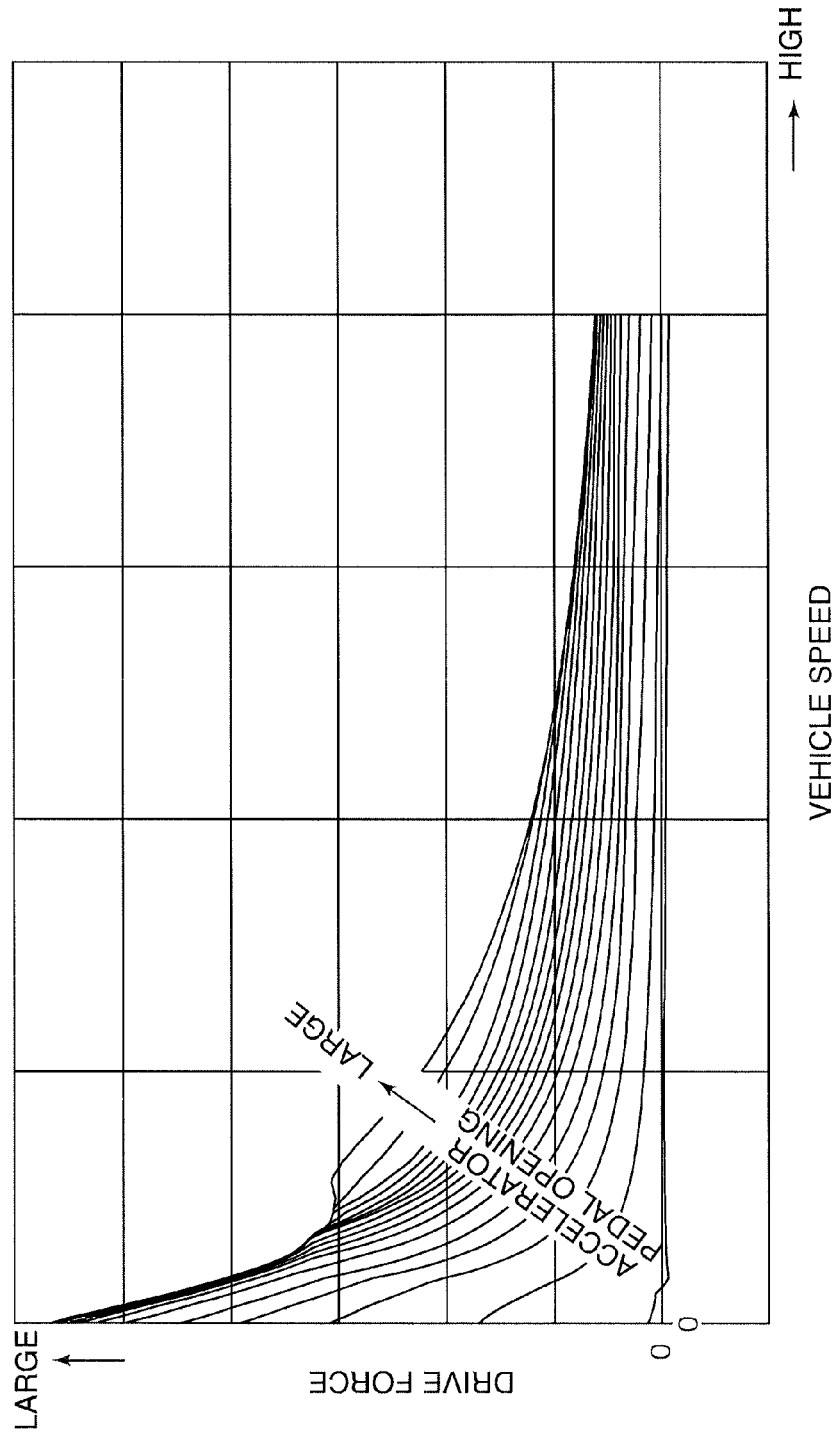
FIG. 4 is a diagram showing an accelerator position dependent drive force in a normal mode of the ETD control.
Figure 5:
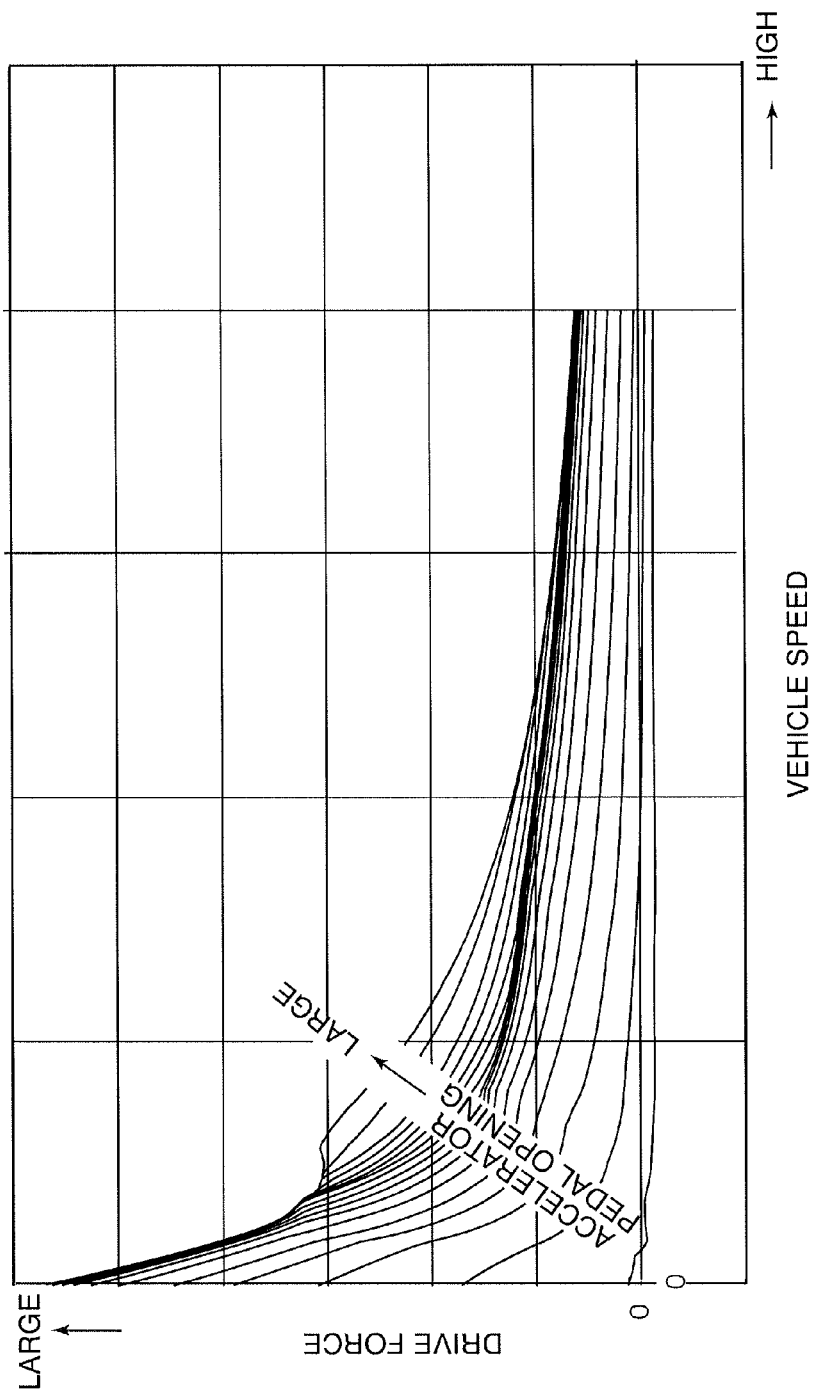
FIG. 5 is a diagram showing an accelerator position dependent drive force in a state where the high limiter is operated in a sport mode of the ETD control.
Figure 6:
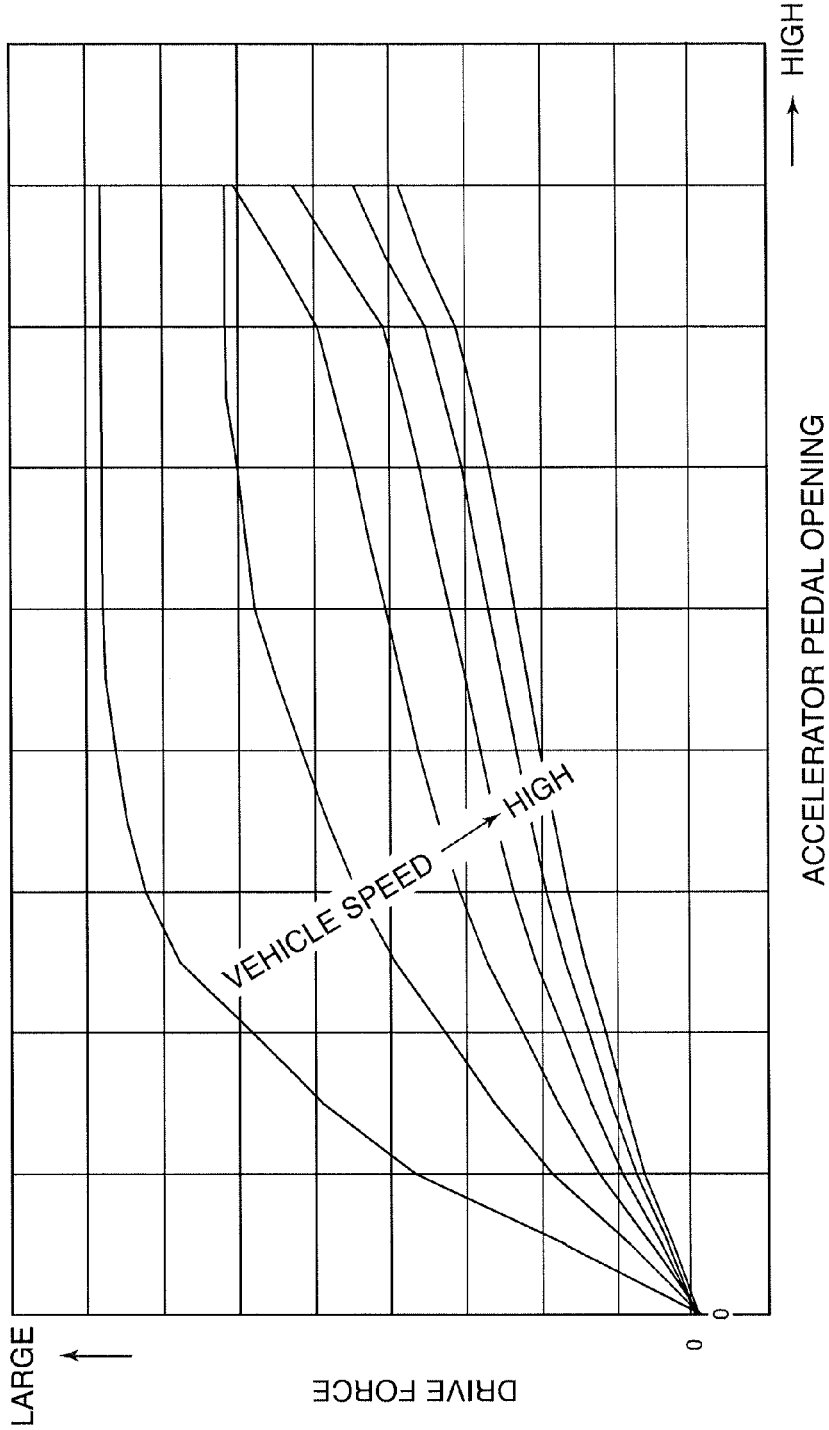
FIG. 6 is a diagram showing the accelerator position dependent drive force of FIG. 4 with axes of representation of the vehicle speed and the accelerator pedal opening switched.
Figure 7:
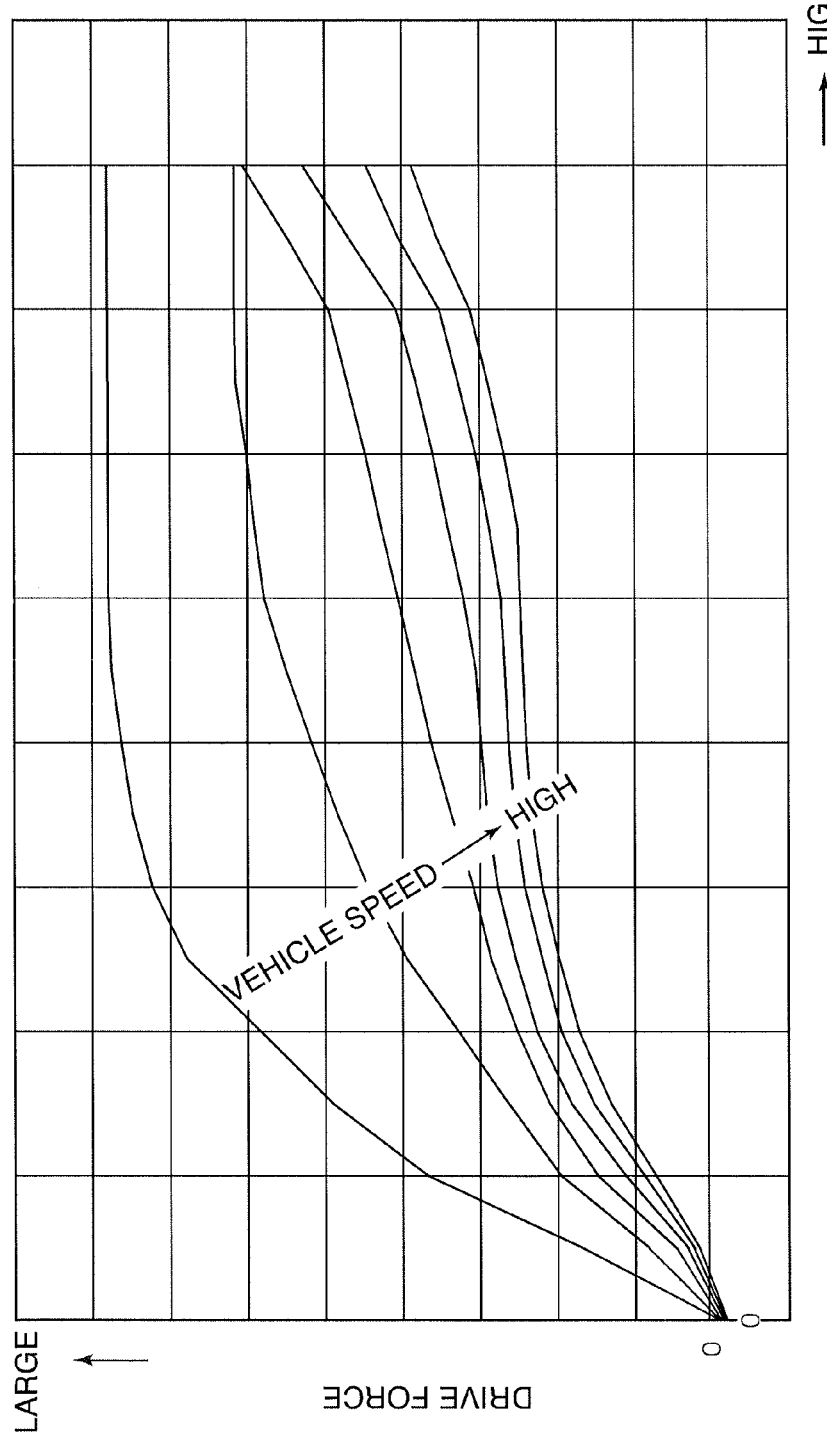
FIG. 7 is a diagram showing the accelerator position dependent drive force of FIG. 5 with axes of representation of the vehicle speed and the accelerator pedal opening switched.

FIGS. 4 and 6 show an accelerator position dependent drive force in the normal mode of the ETD control. FIGS. 5 and 7 show an accelerator position dependent drive force in the sport mode of the ETD control. In the ETD control, a drive force in a medium vehicle speed region is increased by replacing a shift map of FIG. 2 with a shift map of FIG. 3 in the sport mode. Specifically, this is performed by setting the high limiter for limiting the speed ratio on the Hi side.

The drive force control device according to this embodiment realizes a similar drive force control during the PTD control.

Figure 13:
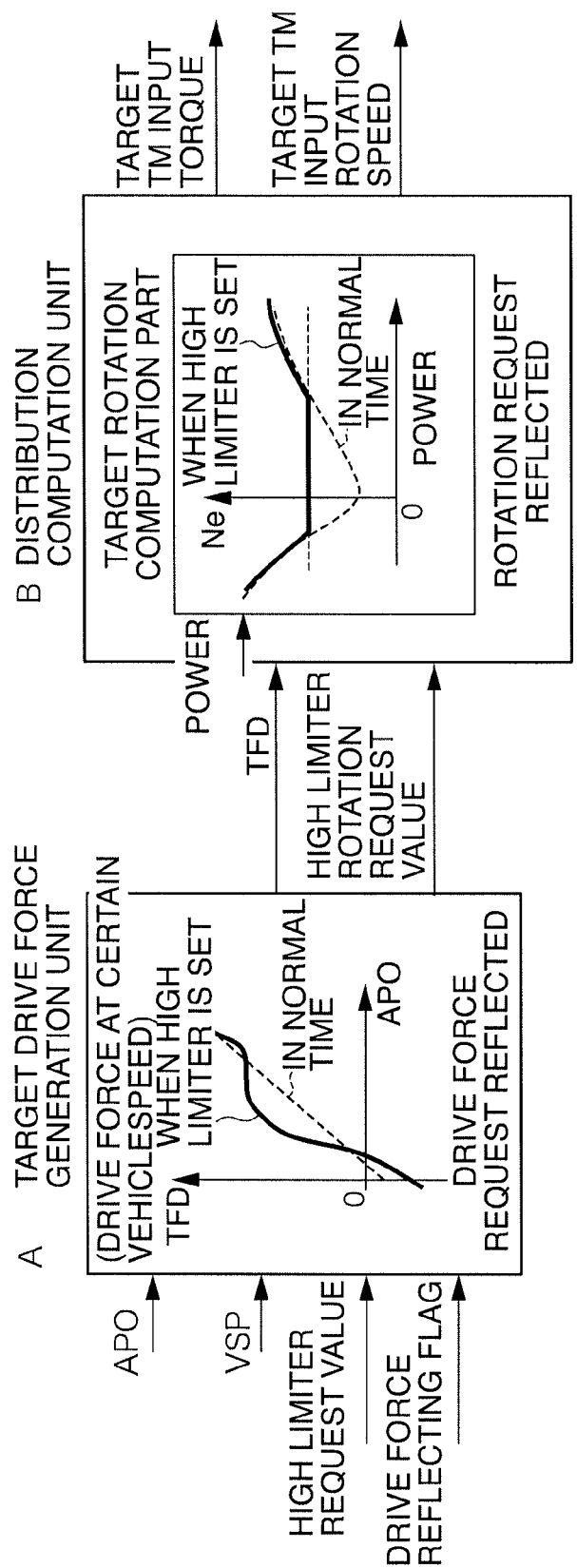
FIG. 13 is a block diagram showing functions of a target drive force generation unit and a distribution computation unit provided in the drive force control device.

Referring to FIG. 13, a control executed by the drive force control device will be described. It should be noted that each block shown in FIGS. 13 to 24 shows each function of the controller 21 as a virtual unit, which does not mean physical existence.

Referring to FIG. 13, the controller 21 comprises a target drive force generation unit A and a distribution computation unit B. The target drive force generation unit A computes a target drive force TFD when the high limiter is applied based on input signals such as those indicating an accelerator pedal opening APO and a vehicle speed VSP. The distribution computation unit B computes a target transmission (TM) input torque and a target TM input rotation speed of the CVT 12 to achieve the target drive force.

A diagram shown in a block of the distribution computation unit B will be described. In a normal speed ratio control, a relationship of a vehicle drive force and an engine rotation speed Ne is so set that the engine rotation speed Ne is lowest when the drive force is zero, i.e. near a boundary between a negative drive force or engine braking and a positive drive force as shown in broken line. The distribution computation unit B computes the target TM input torque and the target TM input rotation speed of the CVT 12 to achieve the target drive force of the CVT 12 so that the same result is obtained in the PTD control.

For that, the target drive force generation unit A increases the target drive force in relation to the accelerator pedal opening APO in a certain region of the accelerator pedal opening APO as shown in solid line with respect to a characteristic in normal time shown in broken line as shown in a diagram shown in a block.

Figure 14:
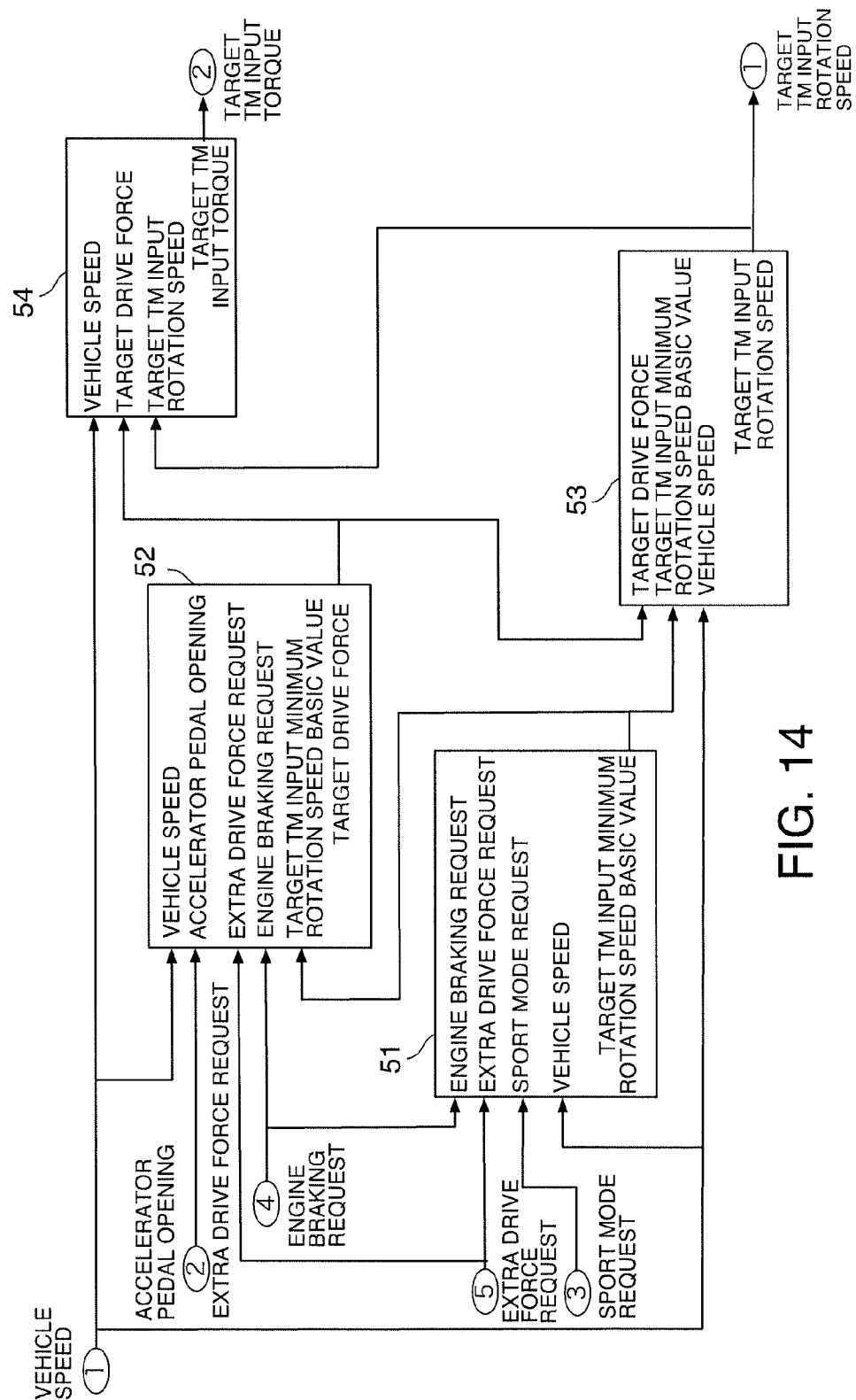
FIG. 14 is a block diagram showing the configurations of the target drive force generation unit and the distribution computation unit.

Referring to FIG. 14, the target drive force generation unit A is constituted by a target TM input minimum rotation speed basic value computation part 51 and a target drive force computation part 52. The distribution computation unit B is constituted by a target TM input rotation speed computation part 53 and a target TM input torque computation part 54. Under these configurations, the controller 21 controls the intake throttle device 3 and the CVT 12.

The configuration of each unit is individually described below.

Figure 15:
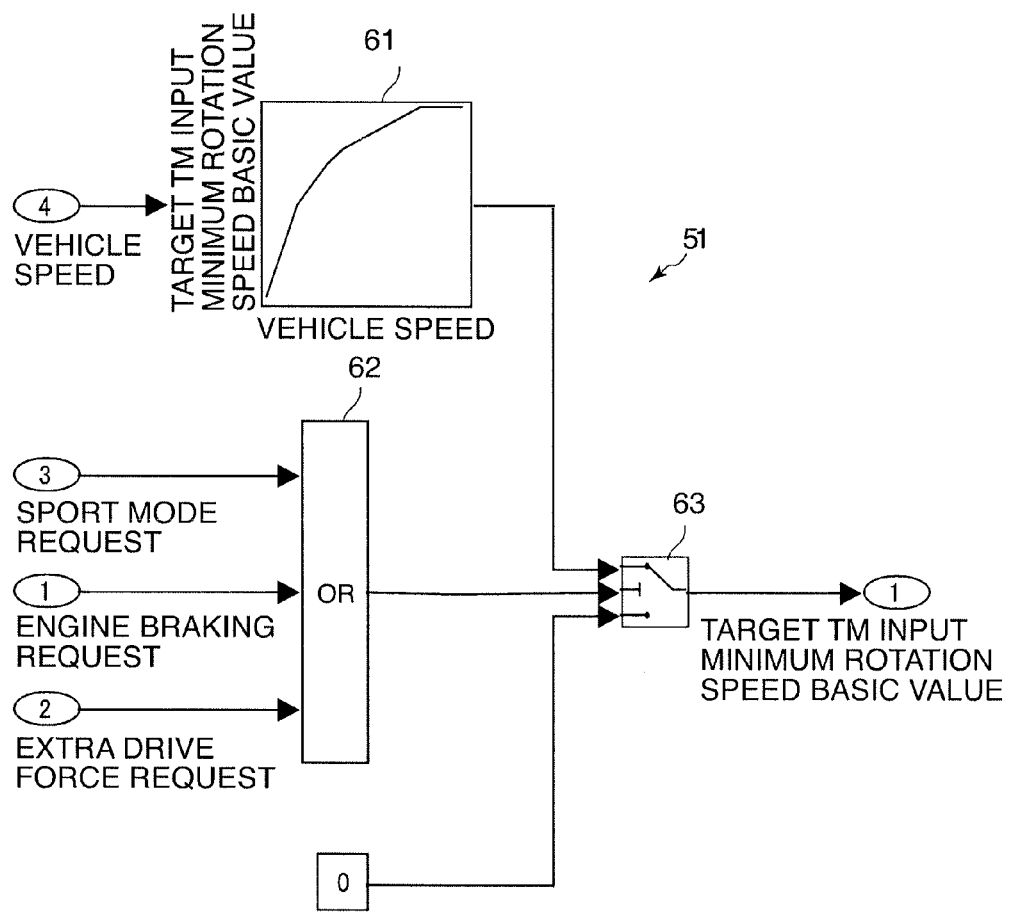
FIG. 15 is a block diagram showing the configuration of a target transmission (TM) input minimum rotation speed basic value computation part provided in the target drive force generation unit.

Referring to FIG. 15, the target TM input minimum rotation speed basic value computation part 51 comprises a target TM input minimum rotation speed basic value retrieval part 61, an OR circuit 62 and a switch 63.

The target TM input minimum rotation speed basic value retrieval part 61 refers to a map stored in the ROM in advance and searches a target TM input minimum rotation speed basic value based on the vehicle speed VSP. The OR circuit 62 outputs an ON-signal to the switch 63 when any one of a sport mode request, an engine braking request and an extra drive force request is made.

The sport mode request is set on when the driver operates a switch attached to a shift lever of the vehicle. The engine braking request is the one issued when it is desired to strengthen engine braking, and set on, for example, when the shift lever is shifted to an L range.

The extra drive force request is set on for the purpose of improving a response of the drive force to the operation of an accelerator based on information such as that on a winding road when the vehicle comprises a navigation system.

The OR circuit 62 switches the switch 63 from zero to a target TM input rotation speed basic value obtained by the target TM input minimum rotation speed basic value retrieval part 61 when any one of these requests is set on. The OR circuit 62 switches the switch 63 from the target TM input minimum rotation speed basic value to zero when all the input requests are off.

Figure 16:
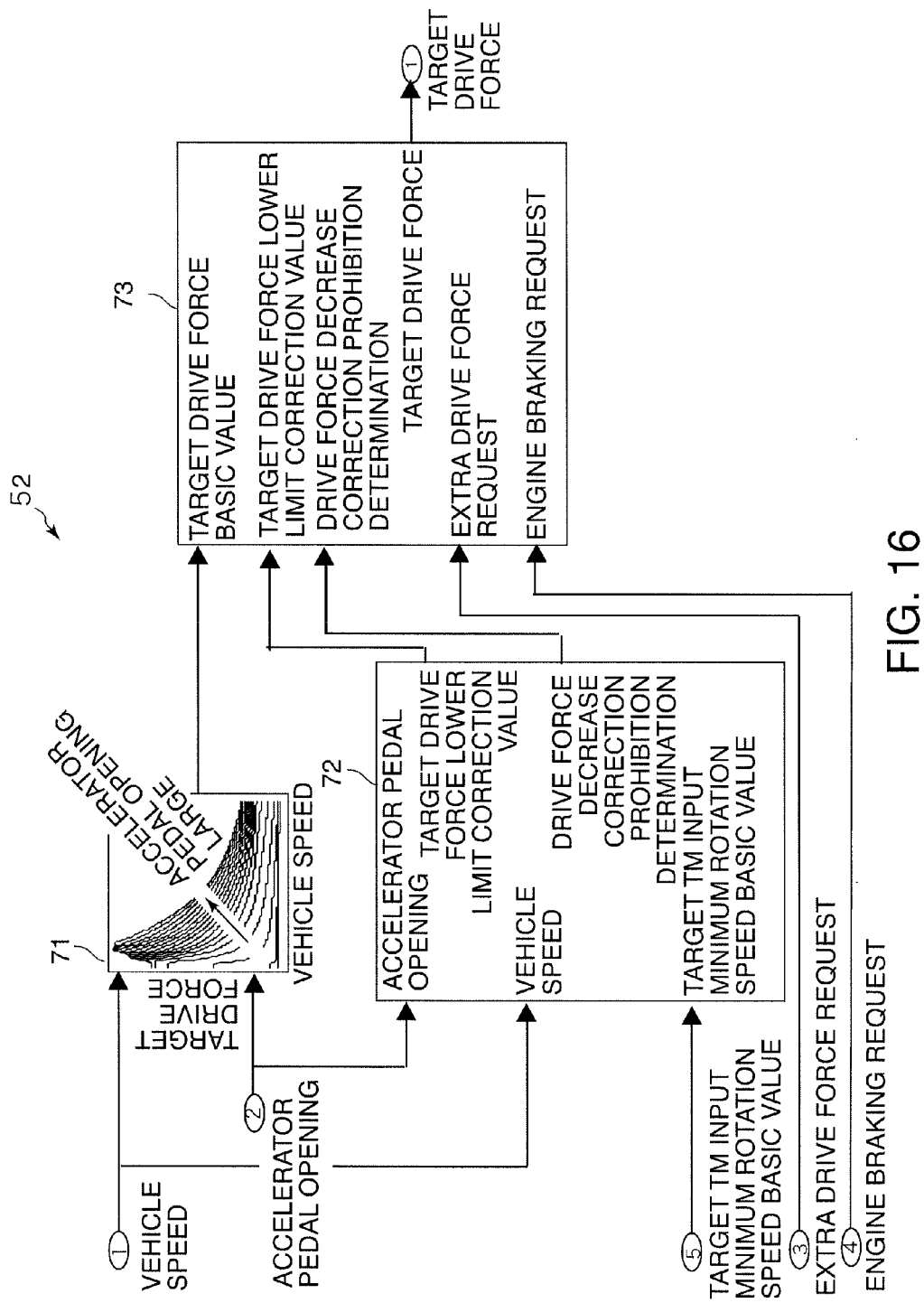
FIG. 16 is a block diagram showing the configuration of a target drive force computation part provided in the target drive force generation unit.

Referring to FIG. 16, the target drive force computation part 52 comprises a target drive force basic value retrieval part 71, a target drive force lower limit correction value computation part 72 and a target drive force lower limit correction part 73.

The target drive force basic value retrieval part 71 refers to a known map stored in the ROM in advance and outputs a target drive force basic value of the vehicle based on the vehicle speed and the accelerator pedal opening.

Figure 17:
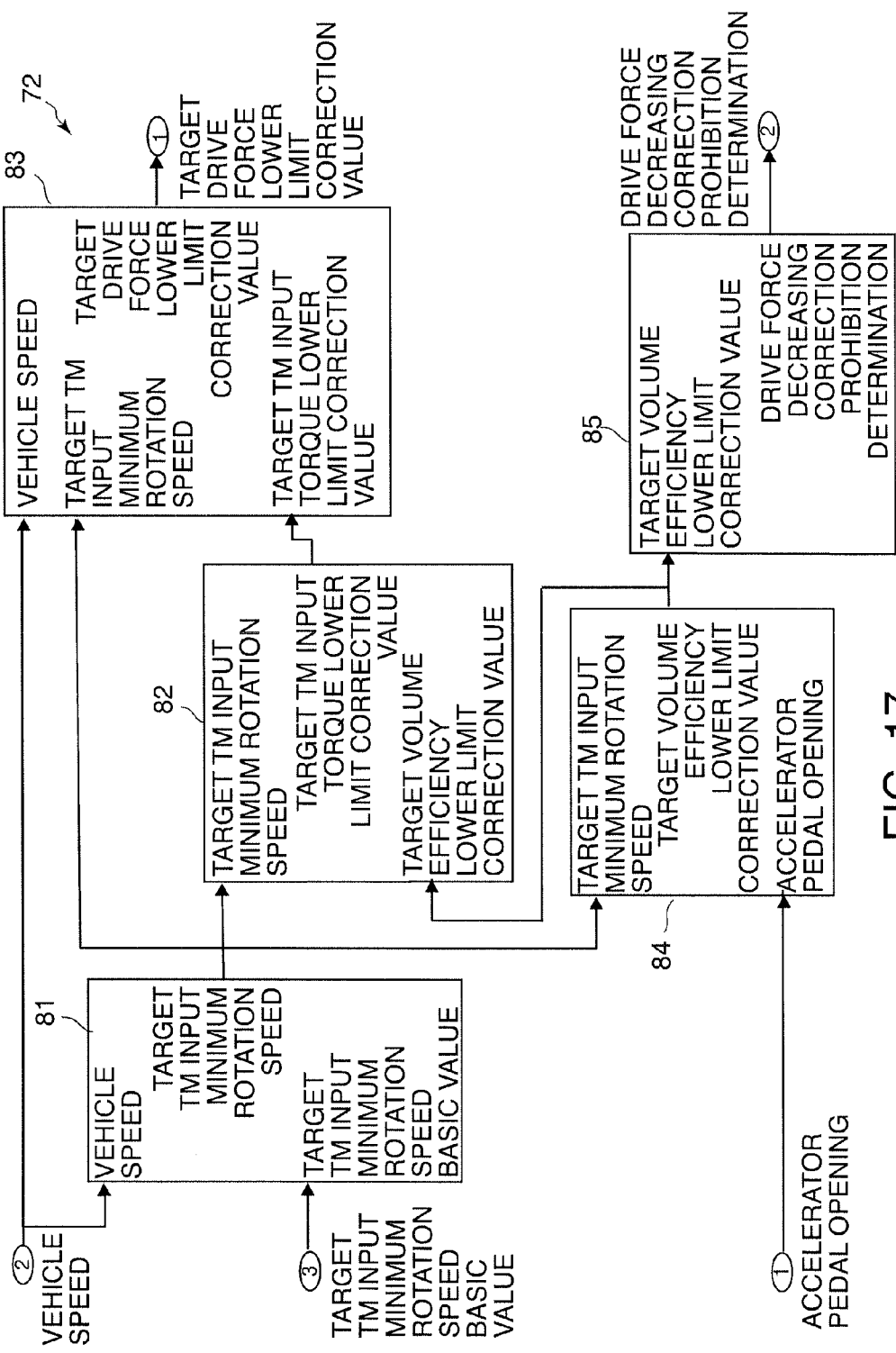
FIG. 17 is a block diagram showing the configuration of a target drive force lower limit correction value computation part provided in the target drive force computation part.

The configuration of the target drive force lower limit correction value computation part 72 is shown in FIG. 17.

Referring to FIG. 17, the target drive force lower limit correction value computation part 72 is constituted by a target TM input minimum rotation speed computation part 81, a target TM input torque lower limit correction value computation part 82, a target drive force lower limit correction value generation part 83, a target volumetric efficiency lower limit correction value computation part 84 and a drive force decrease correction prohibition determination part 85.

Figure 18:
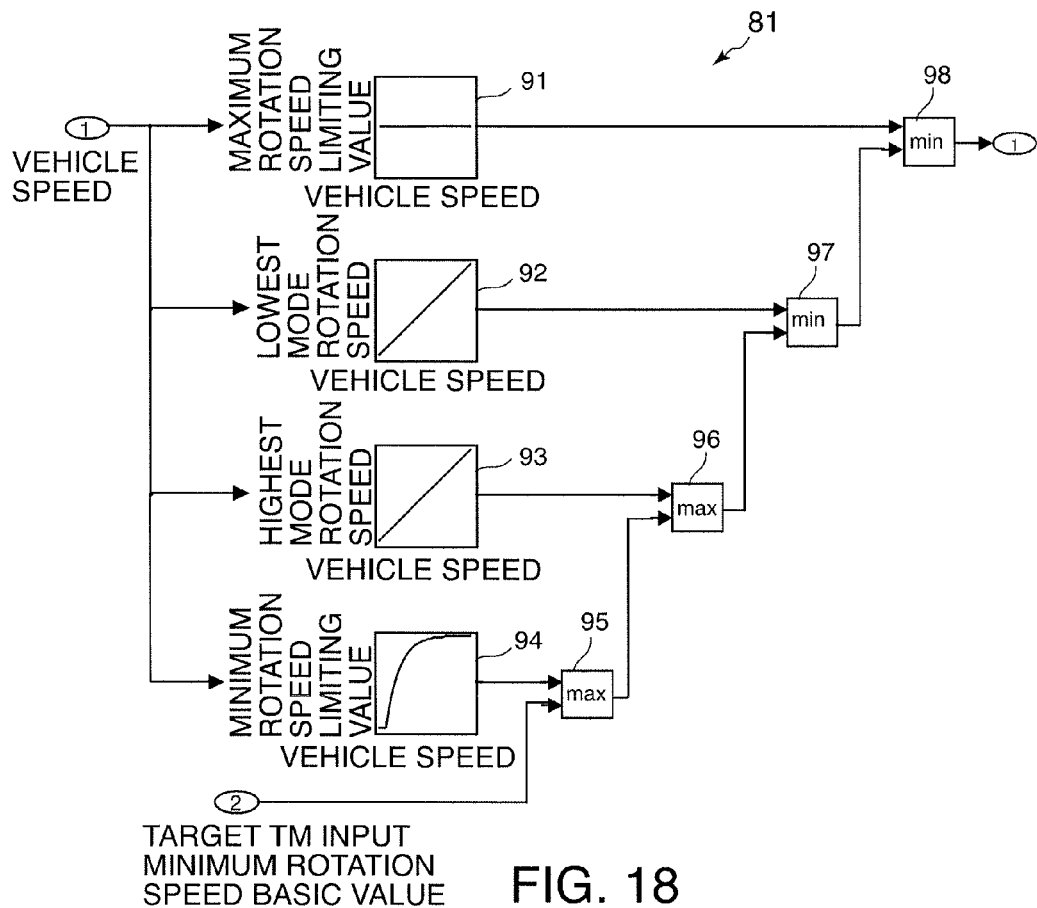
FIG. 18 is a block diagram showing the configuration of a target TM input minimum rotation speed computation part provided in the target drive force lower limit correction value computation part.

Referring to FIG. 18, the target TM input minimum rotation speed computation part 81 comprises a maximum rotation speed limiting value computation part 91, a lowest mode TM input rotation speed computation part 92, a highest mode TM input rotation speed computation part 93, a minimum TM input rotation speed limiting value computation part 94, maximum value output circuits 95, 96 and minimum value output circuits 97, 98.

The maximum rotation speed limiting value computation part 91 sets a maximum rotation speed limiting value from a maximum rotation speed of the internal combustion engine 1. The lowest mode TM input rotation speed computation part 92 computes an input rotation speed corresponding to the lowest speed ratio from the vehicle speed and the lowest speed ratio of the CVT 12. The highest mode TM input rotation speed computation part 93 computes an input rotation speed corresponding to the highest speed ratio from the vehicle speed and the highest speed ratio of the CVT 12. The minimum TM input rotation speed limiting value computation part 94 sets a minimum TM input rotation speed limiting value from the minimum rotation speed of the internal combustion engine 1.

The maximum value output circuit 95 compares the target TM input minimum rotation speed basic value computed by the target TM input minimum rotation speed basic value computation part 51 and the minimum rotation speed lower limiting value and outputs the larger one of them. In other words, a lower limit of the target TM input minimum rotation speed basic value is limited by the minimum TM input rotation speed limiting value.

The maximum value output circuit 96 compares an output of the maximum value output circuit 95 and the highest mode TM input rotation speed and outputs the larger one of them. In other words, a lower limit of the output of the maximum value output circuit 95 is limited by the highest mode TM input rotation speed.

The minimum value output circuit 97 compares an output of the maximum value output circuit 96 and a lowest mode TM input rotation speed and outputs the smaller one of them. In other words, an output of the maximum value output circuit 96 is limited by the lowest mode TM input rotation speed. The minimum value output circuit 98 compares an output of the minimum value output circuit 97 and the maximum rotation speed limiting value and outputs the smaller one of them. In other words, an output of the minimum value output circuit 97 is limited by the maximum rotation speed limiting value.

In this way, the target TM input minimum rotation speed computation part 81 outputs a value limited based on the specifications of the internal combustion engine 1 and the CVT 12 as a target TM input minimum rotation speed.

Figure 19:
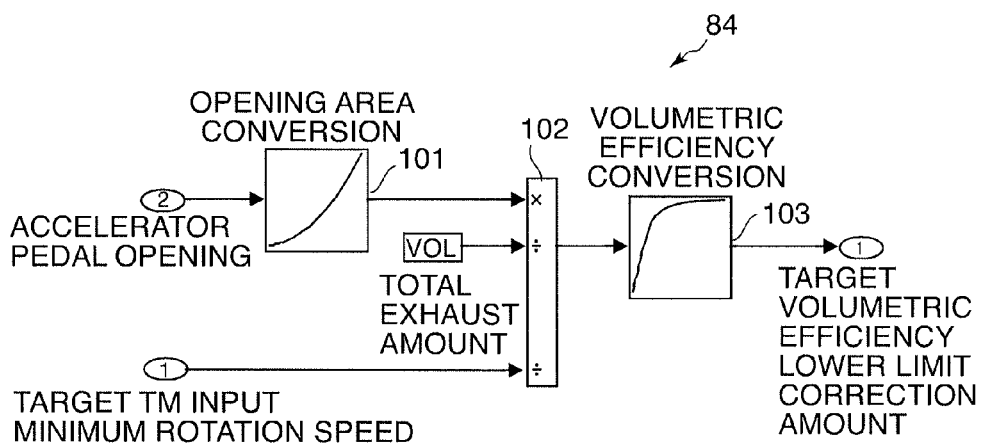
FIG. 19 is a block diagram showing the configuration of a target volumetric efficiency lower limit correction value computation part provided in the target drive force lower limit correction value computation part.

Referring to FIG. 19, the target volumetric efficiency lower limit correction value computation part 84 is constituted by an opening area conversion part 101, a multiplication/division unit 102 and a volumetric efficiency conversion part 103.

The opening area conversion part 101 converts the accelerator pedal opening into an opening area. The multiplication/division unit 102 computes an accelerator requiring opening area per unit exhaust amount or per unit rotation based on the opening area, a total exhaust amount of the internal combustion engine 1 and the target TM input minimum rotation speed computed by the target TM input minimum rotation speed computation part 81. This is converted into a volumetric efficiency by the volumetric efficiency conversion part 103 and the obtained value is output as a target volumetric efficiency lower limit correction value.

The above computation performed by the target volumetric efficiency lower limit correction value computation part 84 is known from Japanese Patent No. 3541661.

It should be noted that since the total exhaust amount of the internal combustion engine 1 is a known fixed value, a three-dimensional map of the target volumetric efficiency lower limit correction value using the opening area and the target TM input minimum rotation speed as parameters can be stored in the ROM in advance and the target volumetric efficiency lower limit correction value can be also directly obtained by searching the map based on the opening area and the target TM input minimum rotation speed.

Figure 20:
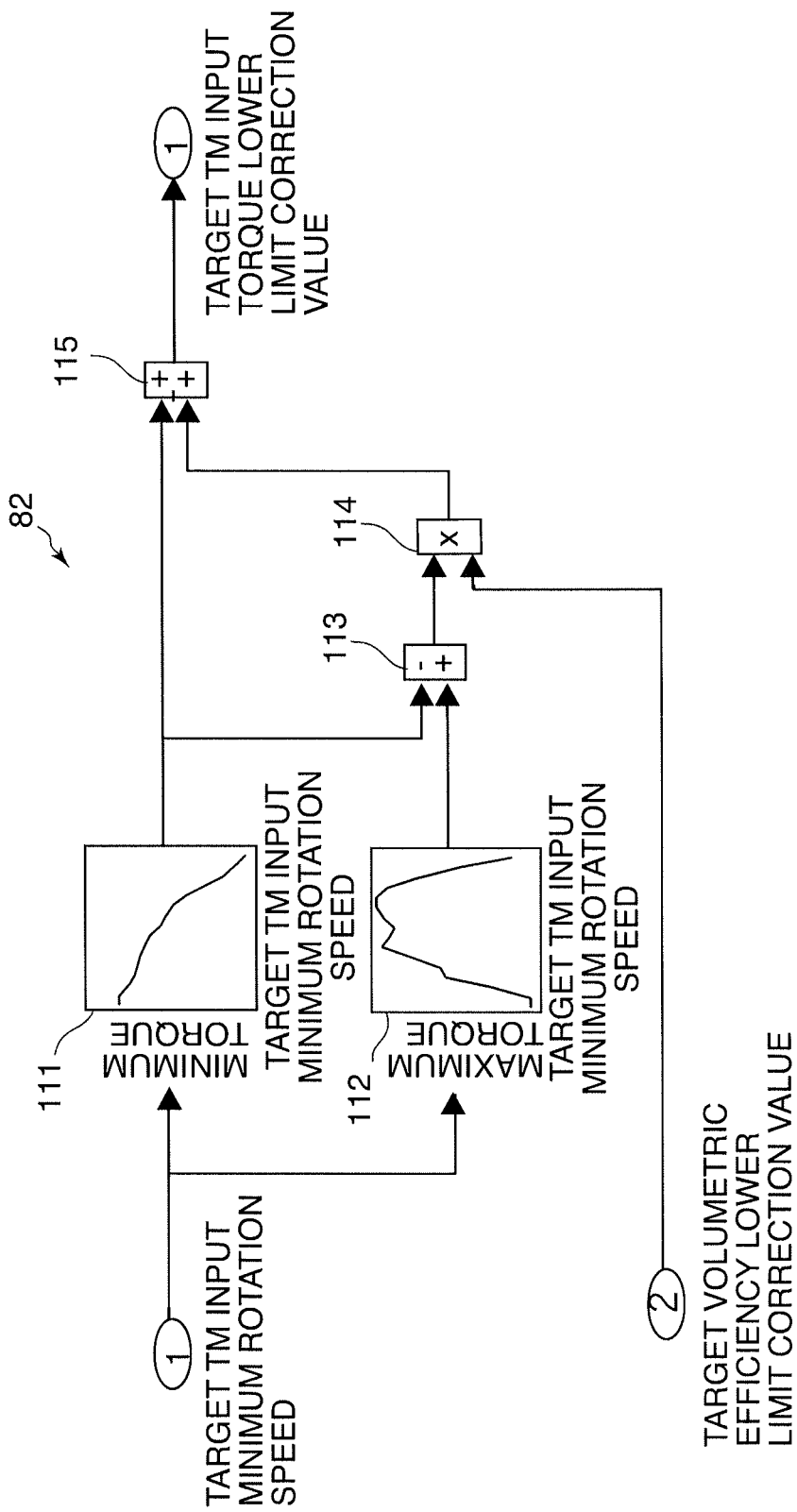
FIG. 20 is a block diagram showing the configuration of a target TM input torque lower limit correction value computation part provided in the target drive force lower limit correction value computation part.

Referring to FIG. 20, the target TM input torque lower limit correction value computation part 82 comprises a minimum torque computation part 111 for computing a minimum value of an input torque to the CVT 12 based on the target TM input minimum rotation speed, a maximum torque computation part 112 for likewise computing a maximum value of the input torque to the CVT 12, a subtractor 113 for computing a difference between the maximum value and the minimum value of the input torque, a multiplier 114 for multiplying the target volumetric efficiency lower limit correction value computed by the target volumetric efficiency lower limit correction value computation part 84 and the difference of the input torque, and an adder 115 for adding the minimum torque and an output of the multiplier 114.

The configuration of the target TM input torque lower limit correction value computation part 82 of FIG. 20 adopts a simple calculation method utilizing a linear relationship of the volumetric efficiency and the engine torque. Specifically, the multiplier 114 calculates a correction amount to be added to the minimum value of the input torque by multiplying the difference of the input torque by the target volumetric efficiency lower limit correction value, and the adder 115 calculates the target TM input torque lower limit correction value by adding the correction amount to the minimum value of the input torque.

Since the engine torque is uniquely determined from the engine rotation speed and the volumetric efficiency, a three-dimensional map of the target TM input torque lower limit correction value using these as parameters can be stored in the ROM in advance and the target TM input torque lower limit correction value can be also directly obtained by searching the map based on the engine rotation speed and the volumetric efficiency.

Figure 21:
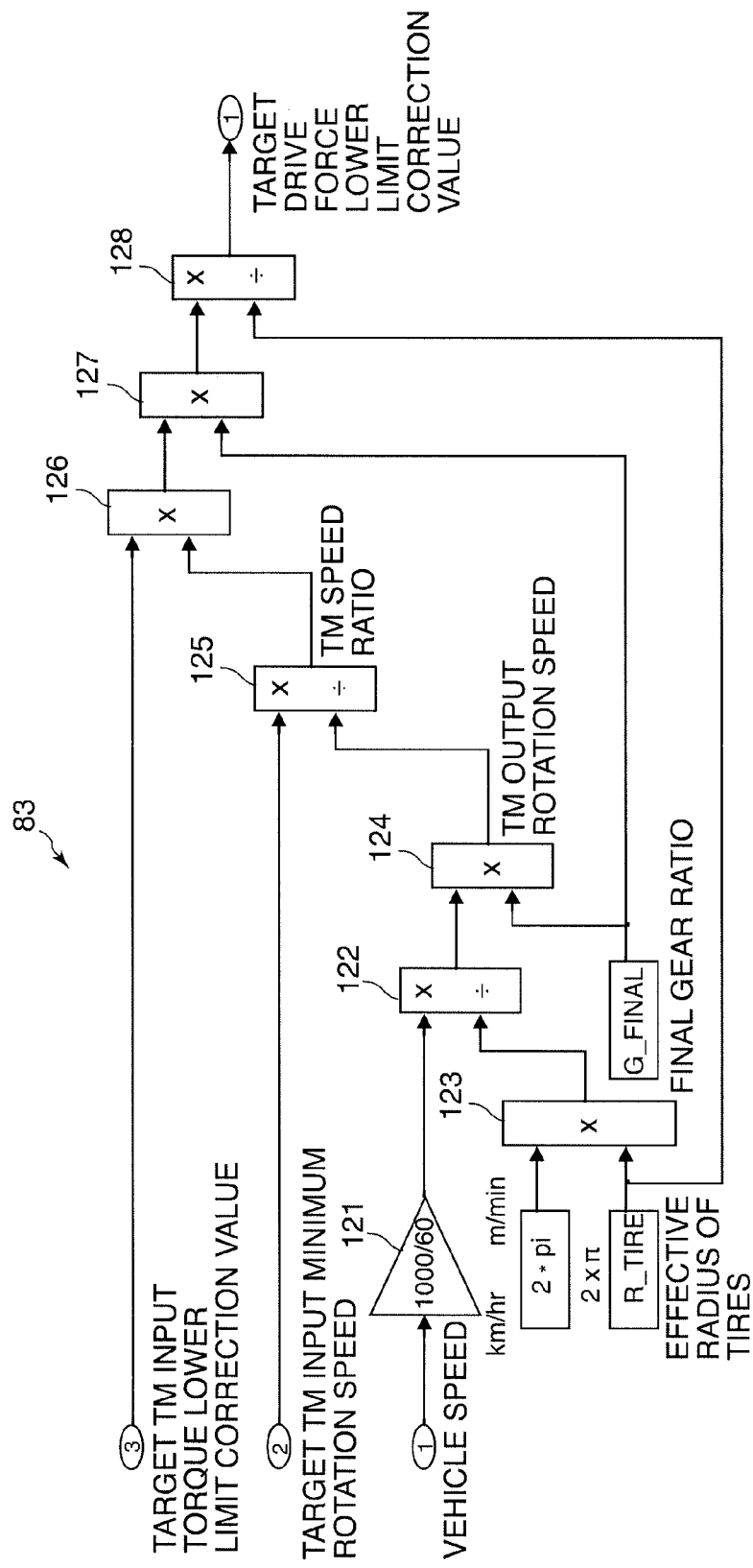
FIG. 21 is a block diagram showing the configuration of a target drive force lower limit correction value generation part provided in the target drive force lower limit correction value computation part.

Referring to FIG. 21, the target drive force lower limit correction value generation part 83 comprises a unit converter 121, dividers 122, 125 and 128 and multipliers 123, 124, 126 and 127.

The unit converter 121 converts the vehicle speed in units of m/min. The multiplier 123 computes a circumferential length of tires from a radius of the tires. The divider 122 computes a rotation speed of the tires from the vehicle speed and the circumferential length of the tires. The multiplier 124 computes the output rotation speed of the CVT 12 by multiplying the rotation speed of the tires by a gear ratio of the final gear 18 provided between the CVT 12 and drive wheels of the vehicle. The divider 125 converts the target TM input minimum rotation speed into a target speed ratio of the CVT 12 by dividing the target TM input minimum rotation speed by the output rotation speed of the CVT 12.

Figure 8:
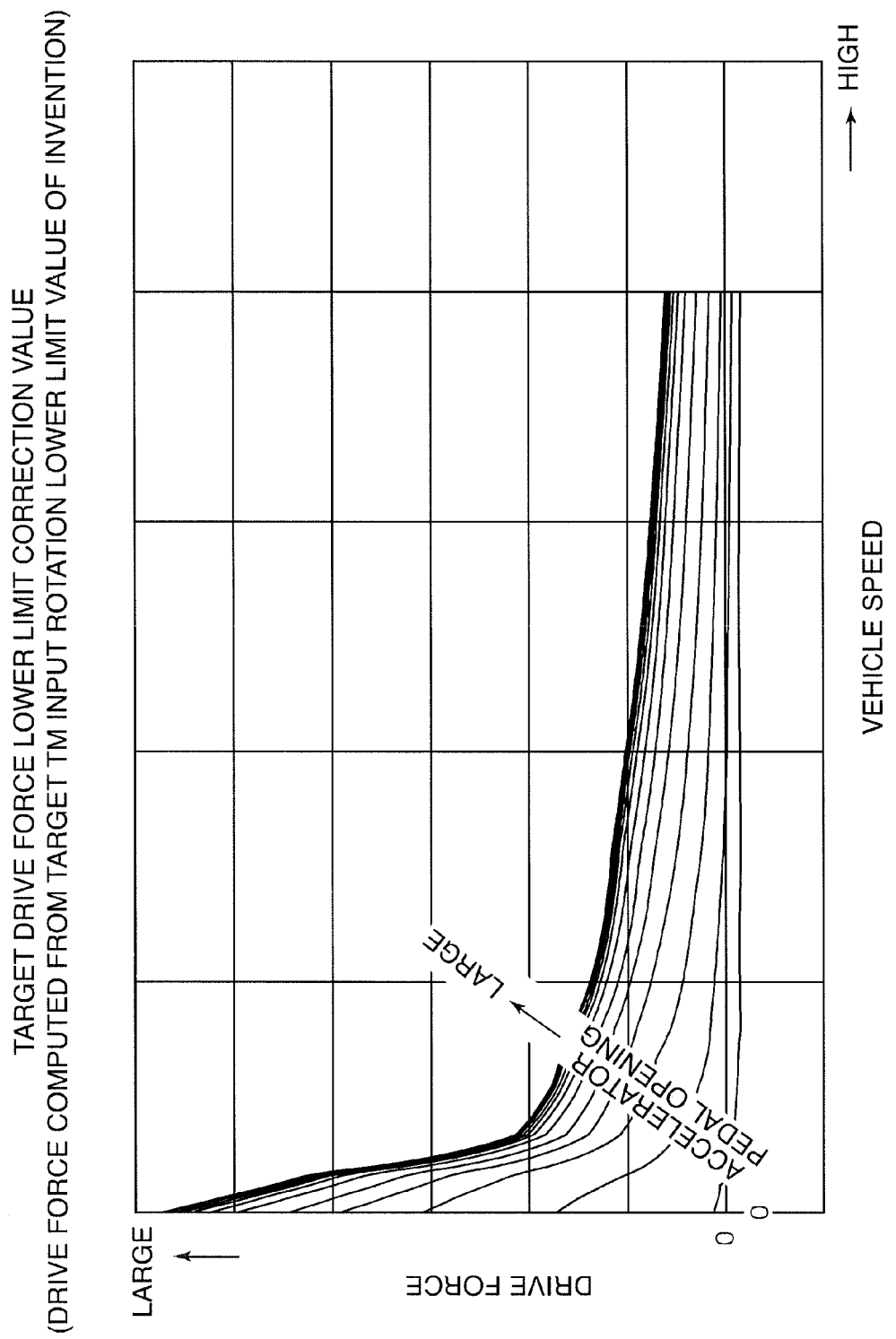
FIG. 8 is a diagram showing a characteristic of a target drive force lower limit correction value computed by a target drive force lower limit correction value computation part provided in the drive force control device.
Figure 10:
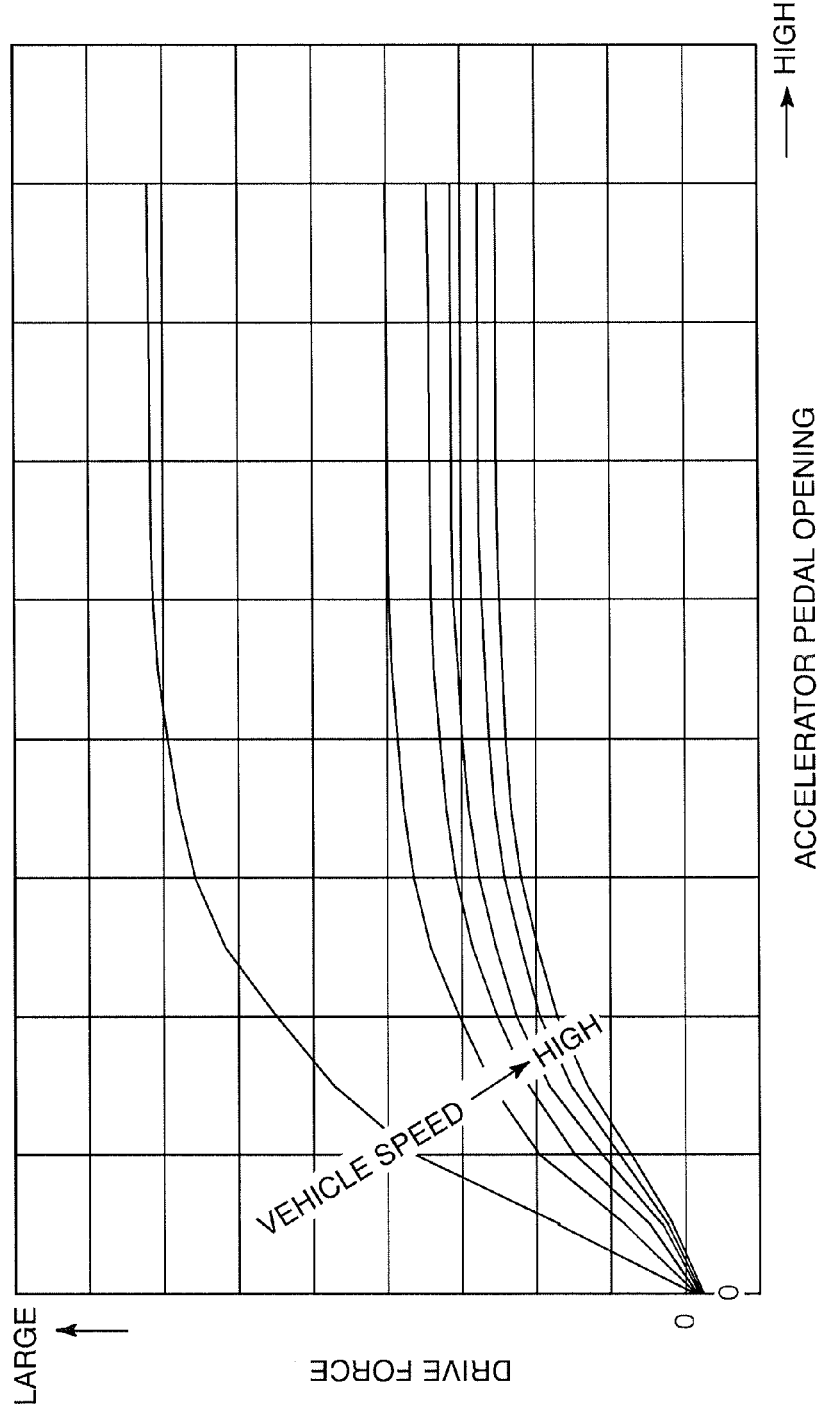
FIG. 10 is a diagram showing the target drive force lower limit correction value of FIG. 8 with axes of representation of the vehicle speed and the accelerator pedal opening switched.

The divider 126 computes a target output torque lower limit correction value by multiplying the target TM input torque lower limit correction value by the target speed ratio of the CVT 12. The multiplier 127 computes a final torque correction value by multiplying the target output torque lower limit correction value by the final gear ratio, and the divider 128 computes a target drive force lower limit correction value by dividing the final torque correction value by an effective radius R_TIRE of the tires. FIGS. 8 and 10 show an example of the target drive force lower limit correction value computed by the target drive force lower limit correction value generation part 83.

Figure 22:
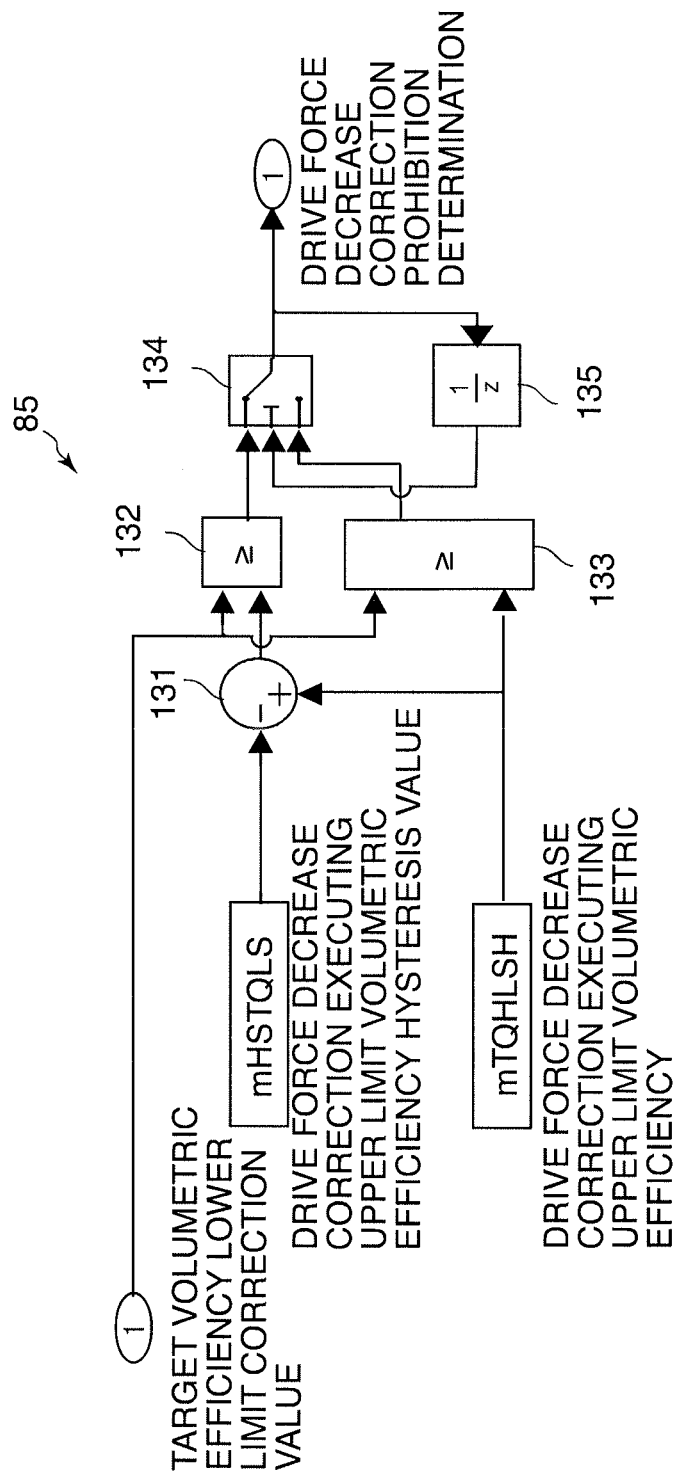
FIG. 22 is a block diagram showing the configuration of a drive force decrease correction prohibition determination part provided in the target drive force lower limit correction value computation part.

Referring to FIG. 22, the drive force decrease correction prohibition determination part 85 comprises a subtractor 131, comparators 132, 133, a switch 134 and a delay circuit 135. The subtractor 131 inputs a value obtained by subtracting a hysteresis value mHSTQLS from a drive force decrease correction executing upper limit volumetric efficiency mTQHLSH as a comparison value to the comparator 132. The comparator 132 determines whether or not the target volumetric efficiency lower limit correction value output by the volumetric efficiency conversion part 103 is not smaller than the comparison value and inputs a determination result as a Boolean value indicating YES or NO to the switch 134.

On the other hand, the comparator 133 determines whether or not the target volumetric efficiency lower limit correction value output by the volumetric efficiency conversion part 103 is not smaller than the drive force decrease correction executing upper limit volumetric efficiency mTQHLSH and outputs a determination result as a Boolean value indicating YES or NO to the switch 134. The switch 134 switches the input value from the comparator 132 and that from the comparator 133 with the last drive force decrease correction prohibition determination result input via the delay circuit 135 as a trigger.

Processing contents of the drive force decrease correction prohibition determination part 85 will now be summarized. Basically, whether or not the target volumetric efficiency lower limit correction value output by the volumetric efficiency conversion part 103 is not smaller than the drive force decrease correction executing upper limit volumetric efficiency mTQHLSH is determined and a drive force decrease correction is prohibited when the determination is affirmative. Specifically, to perform the drive force decrease correction only during deceleration in a low load state, whether or not a load is not lower than a medium load is determined using the volumetric efficiency and the drive force decrease correction is prohibited in a region of the medium load or higher. However, if the target volumetric efficiency lower limit correction value becomes not smaller than the drive force decrease correction executing upper limit volumetric efficiency mTQHLSH, considering the hysteresis, the prohibition of the drive force decrease correction is not released until the target volumetric efficiency lower limit correction value falls below the comparison value obtained by subtracting the hysteresis value mHSTQLS from the drive force decrease correction executing upper limit volumetric efficiency mTQHLSH.

Figure 23:
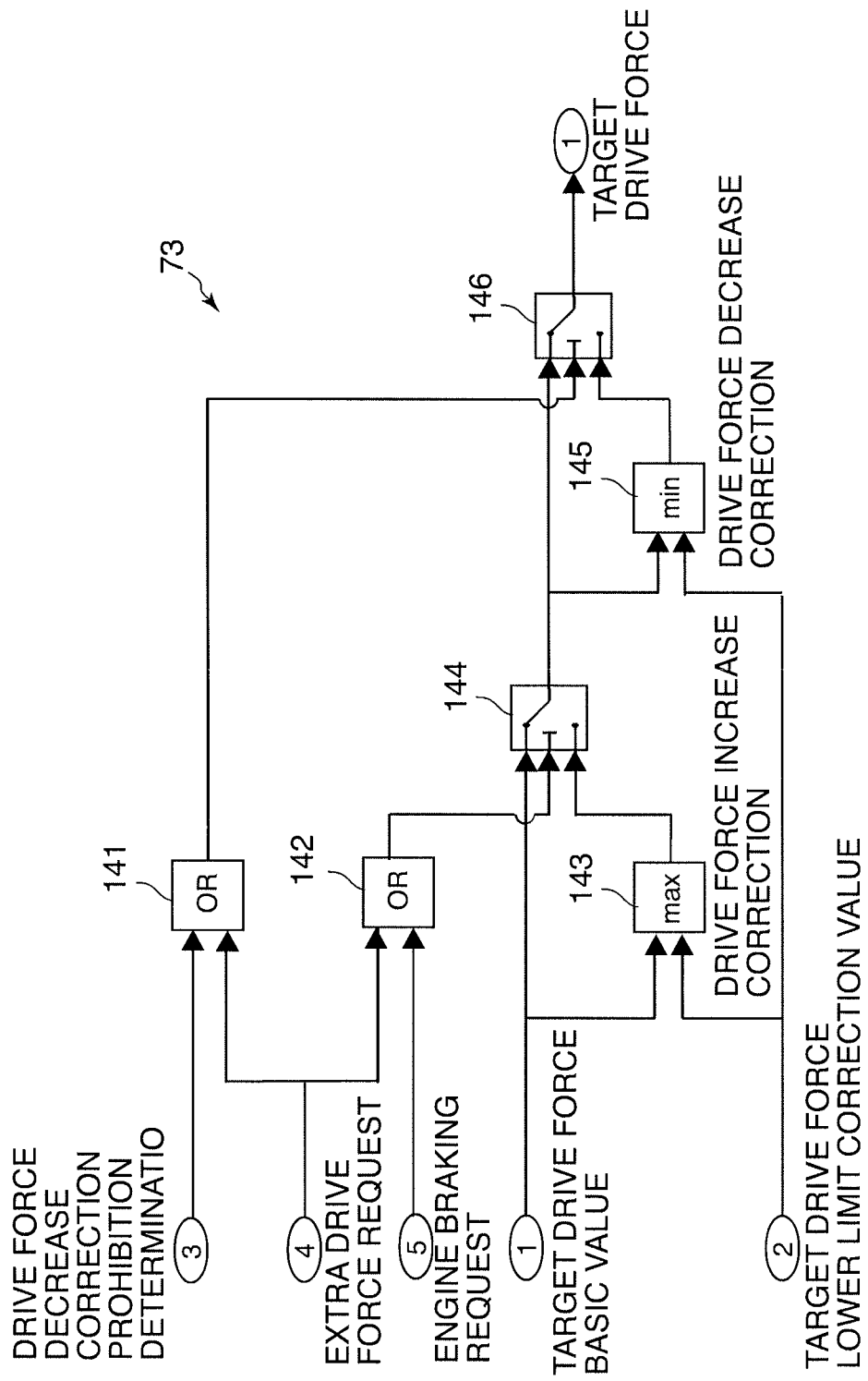
FIG. 23 is a block diagram showing the configuration of a target drive force lower limit correction part provided in the target drive force computation part.

Referring to FIG. 23, the target drive force lower limit correction part 73 comprises OR circuits 141, 142, a maximum value output circuit 143, switches 144, 146 and a minimum value output circuit 145.

The OR circuit 141 outputs an ON-signal when either one of the drive force decrease correction prohibition determination result output by the drive force decrease correction prohibition determination part 85 and the extra drive force request described with reference to FIG. 15 is on. The OR circuit 142 outputs an ON-signal when either one of the extra drive force request and the engine braking request is on. The maximum value output circuit 143 outputs the larger one of the target drive force basic value output by the target drive force basic value retrieval part 71 and the target drive force lower limit correction value output by the target drive force lower limit correction value generation part 83.

Figure 9:
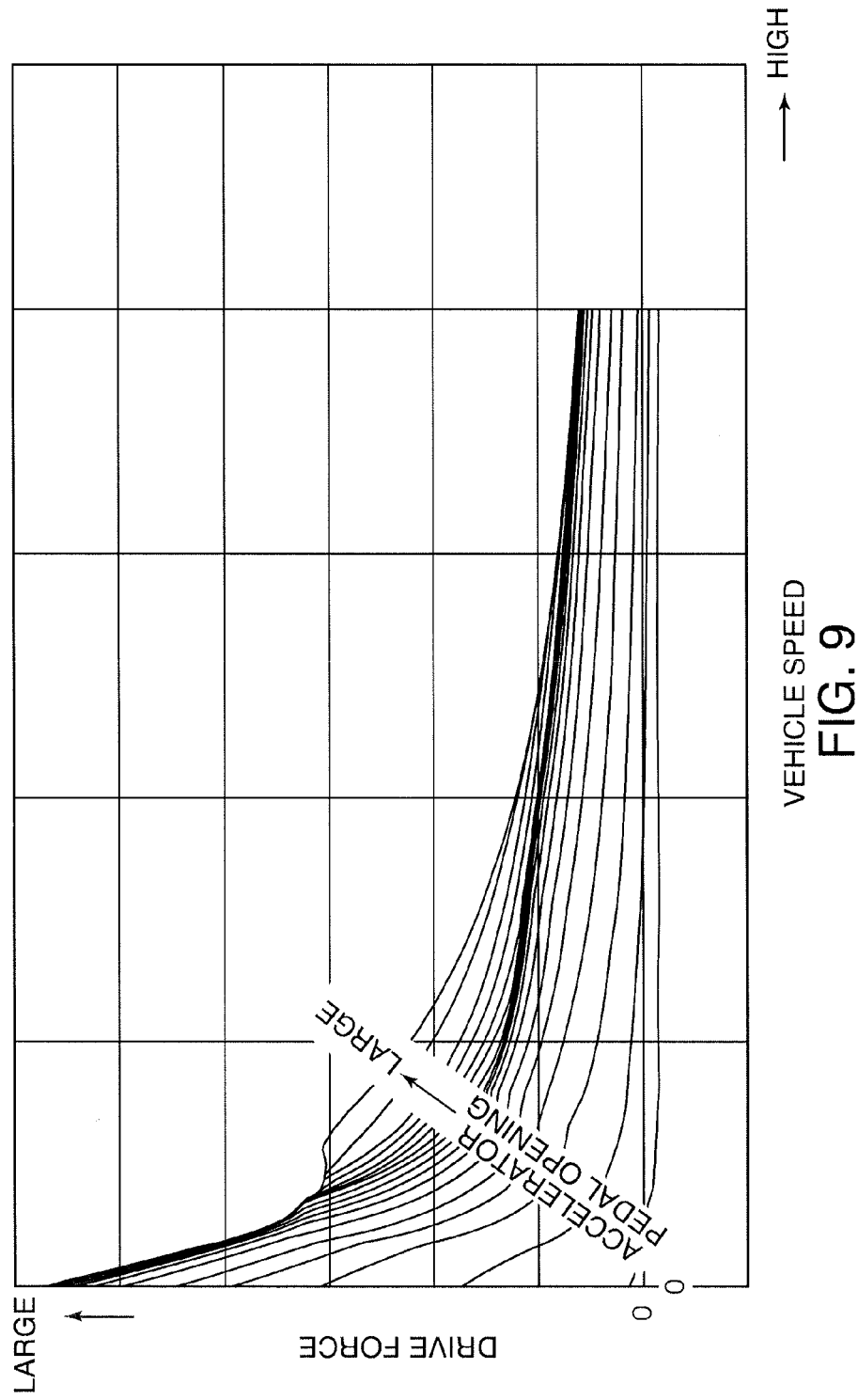
FIG. 9 is a diagram showing a characteristic of a target drive force after correction computed by the target drive force lower limit correction part provided in the drive force control device.
Figure 11:
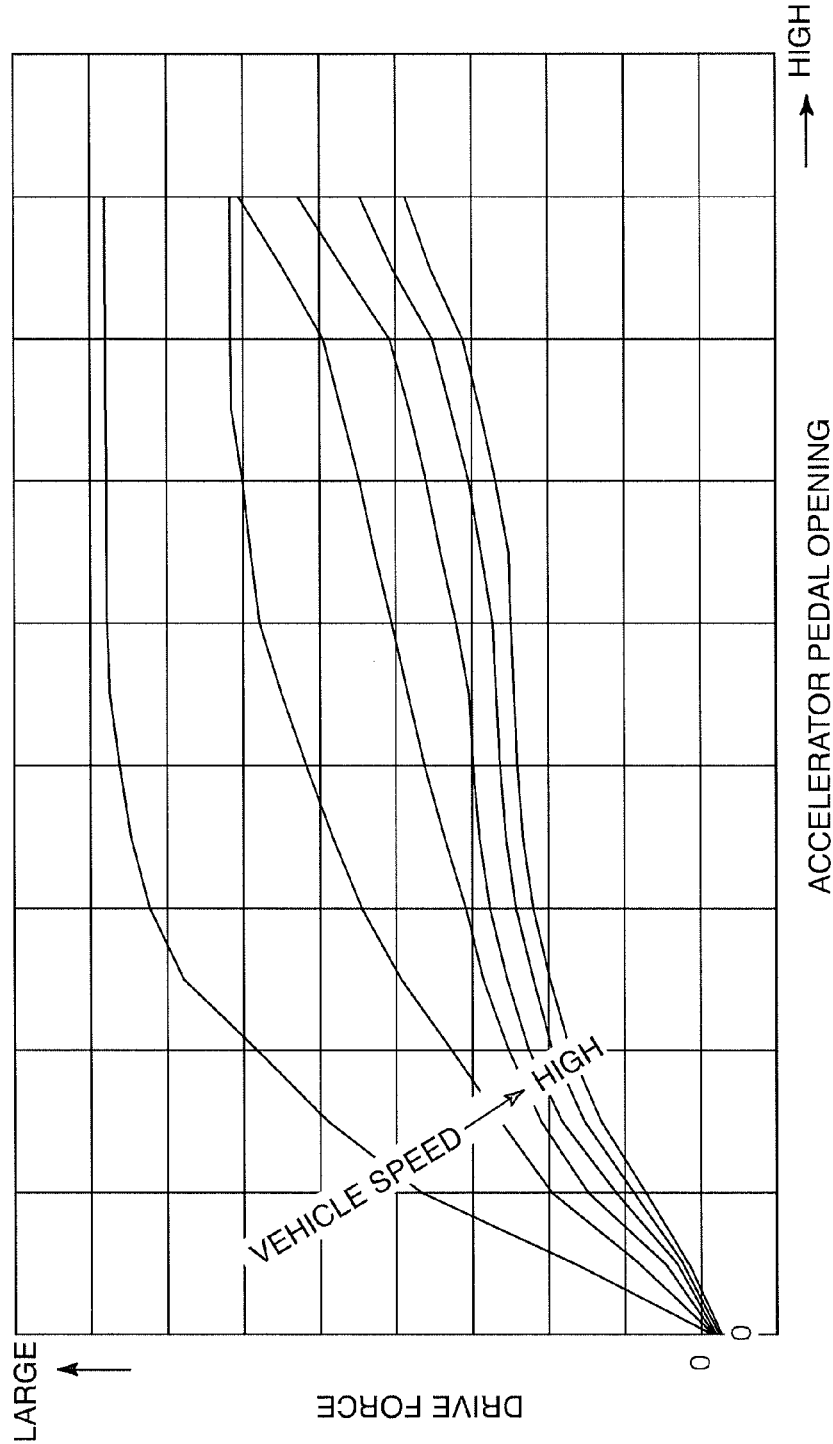
FIG. 11 is a diagram showing the target drive force after correction of FIG. 9 with axes of representation of the vehicle speed and the accelerator pedal opening switched.

The switch 144 outputs the target drive force basic value when an output of the OR circuit 142 is on while outputting an output value of the maximum value output circuit 143 when the output of the OR circuit 142 is off. The minimum value output circuit 145 outputs the smaller one of an output of the switch 144 and the target drive force lower limit correction value. The switch 146 outputs the output of the switch 144 as the target drive force when an output of the OR circuit 141 is on while outputting an output of the minimum value output circuit 145 as the target drive force when the output of the OR circuit 141 is off. FIGS. 9 and 11 show the target drive force after correction by the target drive force lower limit correction part 73.

The above will be summarized as follows. The target drive force lower limit correction part 73 prohibits an increase correction of the drive force if the extra drive force request or the engine braking request is made. If the drive force decrease correction is prohibited or the extra drive force request is made, the decrease correction of the drive force is prohibited. As a result, both the increase correction and the decrease correction of the drive force are prohibited when the extra drive force request is made. Since only the engine rotation speed is increase corrected by another routine in this case, the extra drive force increases as a result. If the extra drive force request is not made, but the engine braking request is made, the increase correction of the drive force is prohibited. If the sport mode is selected in a state where the drive force decrease correction is not prohibited and neither the extra drive force request nor the engine braking request is made, neither the increase correction nor the decrease correction of the drive force is performed.

Figure 24:
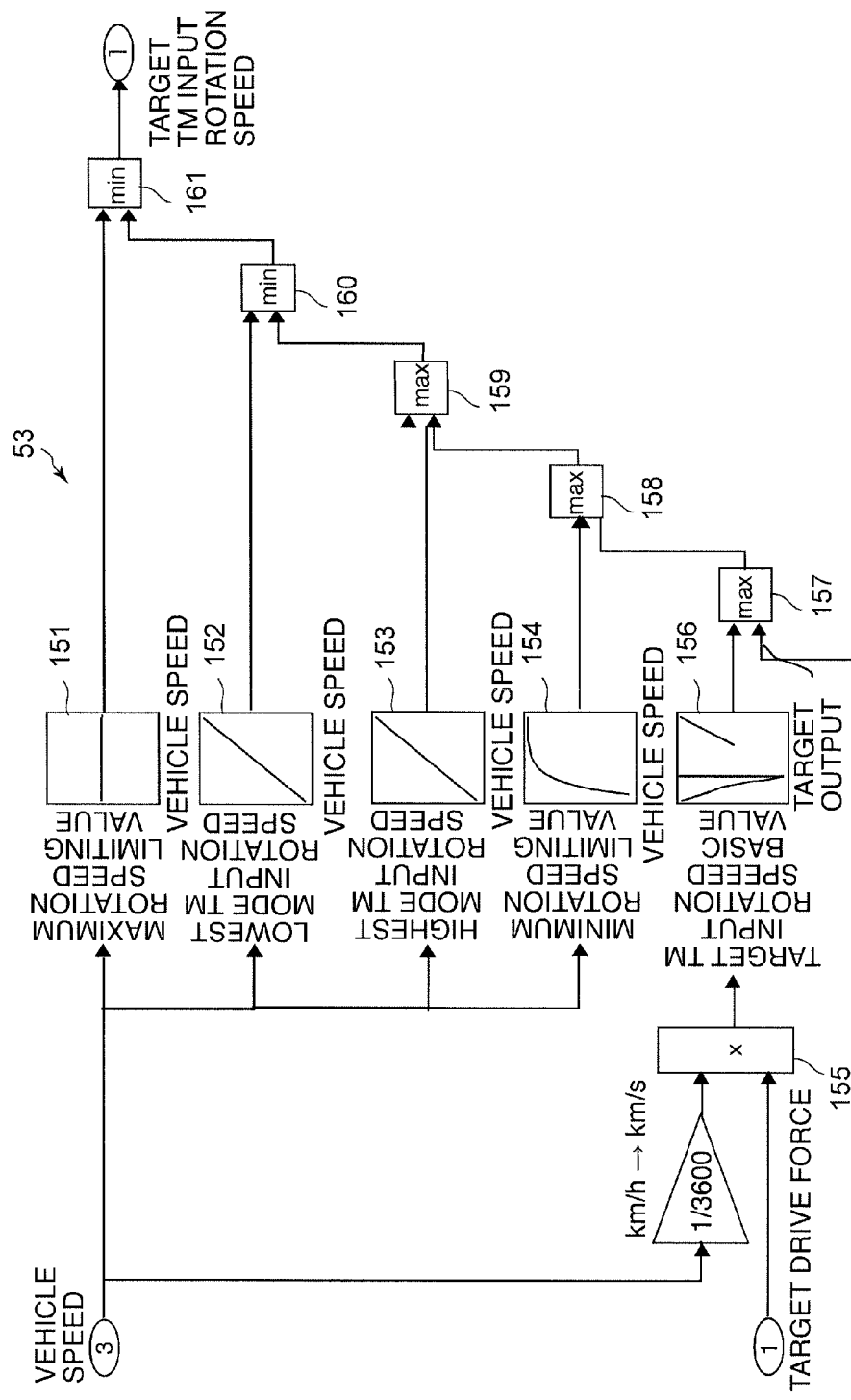
FIG. 24 is a block diagram showing the configuration of a target TM input rotation speed computation part provided in the distribution computation unit.

Referring to FIG. 24, the target TM input rotation speed computation part 53 comprises a maximum rotation speed limiting value computation part 151, a lowest mode TM input rotation speed computation part 152, a highest mode TM input rotation speed computation part 153, a minimum TM input rotation speed limiting value computation part 154, a multiplier 155, a target TM input rotation speed basic value computation part 156, maximum value output circuits 157 to 159 and minimum value output circuits 160, 161.

The maximum rotation speed limiting value computation part 151 outputs a maximum rotation speed limiting value, which is a fixed value stored in advance. The lowest mode TM input rotation speed computation part 152 computes the lowest mode TM input rotation speed from the vehicle speed based on the lowest speed ratio of the CVT 12. The highest mode TM input rotation speed computation part 153 computes the highest mode TM input rotation speed according to the vehicle speed based on the highest speed ratio of the CVT 12. The minimum TM input rotation speed limiting value computation part 154 computes the minimum TM input rotation speed according to the vehicle speed. The multiplier 155 computes a target output by multiplying a converted vehicle speed per second by the target drive force output by the target drive force computation part 52. An output equivalent to a load of an auxiliary machine is also possibly added to the target output. Further, a hybrid electric vehicle (HEV) target power generation output is also possibly added. The target TM input rotation speed basic value computation part 156 computes the target TM input rotation speed basic value based on the target output.

The maximum value output circuit 157 outputs the larger one of the target TM input rotation speed basic value and the target TM input minimum rotation speed basic value output by the target TM input minimum rotation speed basic value computation part 51. The maximum value output circuit 158 outputs the larger one of an output of the maximum value output circuit 157 and the minimum TM input rotation speed limiting value output by the minimum TM input rotation speed limiting value computation part 154. The maximum value output circuit 159 outputs the larger one of an output of the maximum value output circuit 158 and the highest mode TM input rotation speed output by the highest mode TM input rotation speed computation part 153.

The minimum value output circuit 160 outputs the smaller one of an output of the maximum value output circuit 159 and the lowest mode TM input rotation speed output by the lowest mode TM input rotation speed computation part 152. The minimum value output circuit 161 outputs the smaller one of an output of the minimum value output circuit 160 and the maximum rotation speed limiting value output by the maximum rotation speed limiting value computation part 151 as the target TM input rotation speed.

Figure 25:
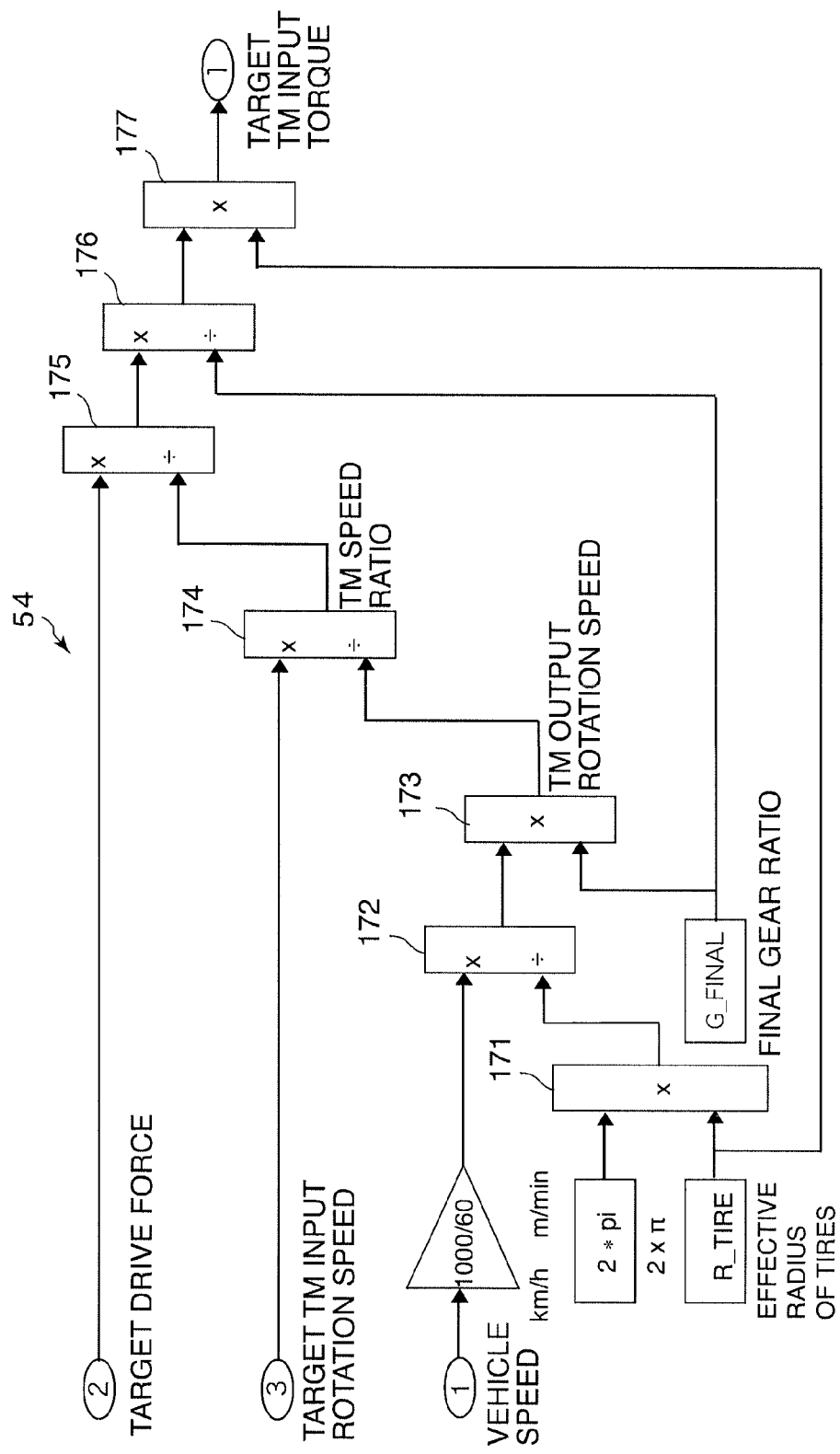
FIG. 25 is a block diagram showing the configuration of a target TM input torque computation part provided in the distribution computation unit.
Figure 26:
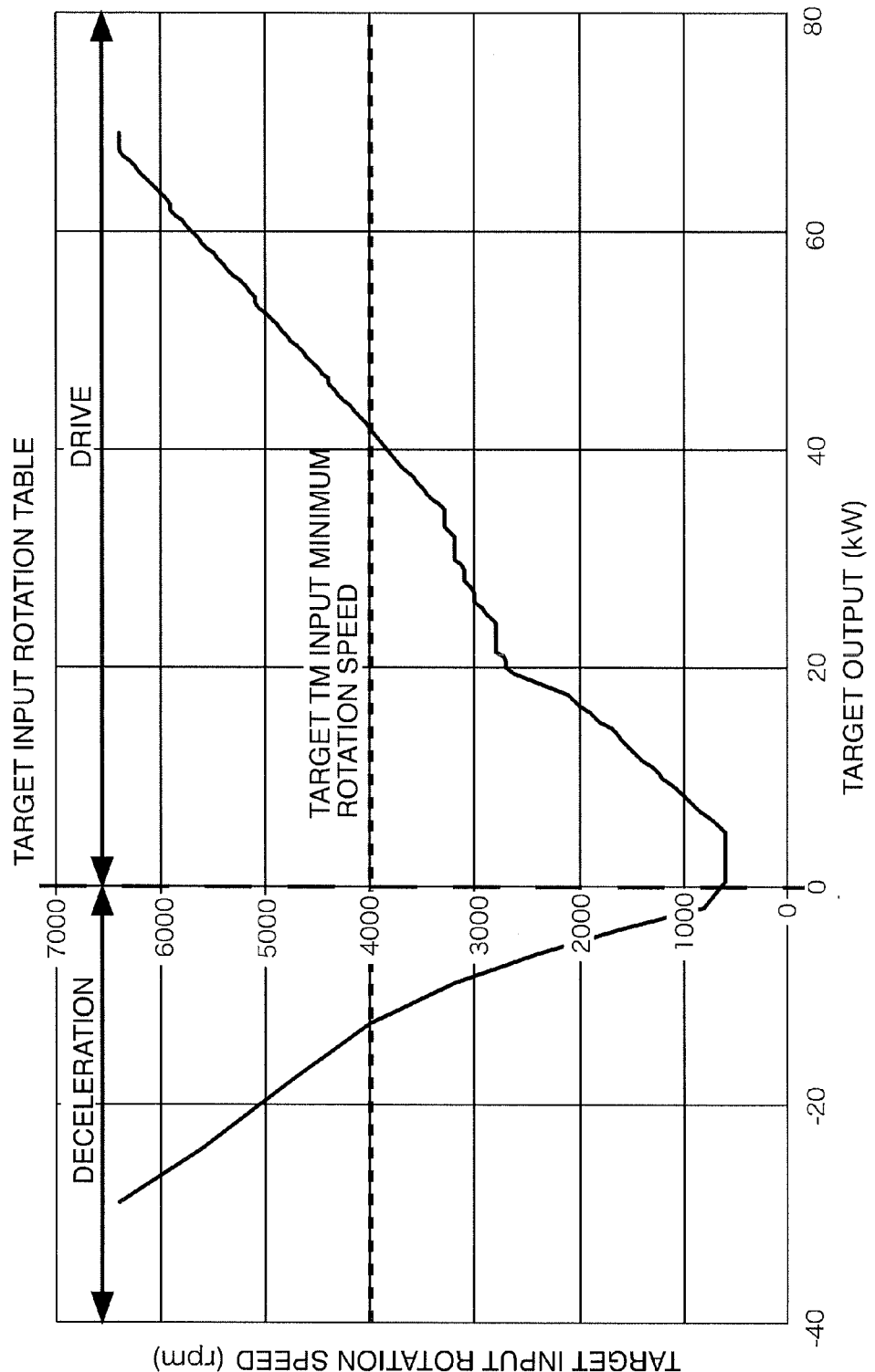
FIG. 26 is a diagram showing an example of a control of a target TM input rotation speed by the drive force control device.

Referring to FIG. 25, the target TM input torque computation part 54 comprises dividers 172, 174 to 176 and multipliers 171, 173 and 177. The multiplier 171 computes the circumferential length of the tires of the vehicle from the effective radius of the tires of the vehicle. The divider 172 computes the rotation speed of the tires by dividing the vehicle speed (m/min) by the circumferential length of the tires. The multiplier 173 computes a TM output rotation speed of the CVT 12 by multiplying the rotation speed of the tires by the final gear ratio. The divider 174 computes a TM speed ratio of the CVT 12 from a ratio of the target TM input rotation speed computed by the target TM input rotation speed computation part 53 and the TM output rotation speed. The dividers 175, 176 compute a TM target input drive force by dividing the target drive force computed by the target drive force computation part 52 by the TM speed ratio and the final gear ratio. The multiplier 177 computes a target TM input torque by multiplying the TM target input drive force by the circumferential length of the tires.

According to the target TM input torque computation part 54, the target TM input torque changes, but the vehicle drive force as a result does not change in the case of correcting only the target TM input rotation speed without correcting the target drive force. That is, an extra torque of the internal combustion engine changes with the vehicle drive force kept constant.

It should be noted that it is also possible to use an actual TM input rotation speed detected by the primary pulley rotation speed sensor 24 instead of the target TM input rotation speed. However, in that case, it is desired to consider a shift response delay of the CVT 12 and perform a processing of compensating for a response delay in the computation of the target TM input torque for realizing the target drive force.

The controller 21 computes the target TM input torque and the target TM input rotation speed by the process described above. The controller 21 controls the throttle opening through the operation of the electric motor 5 of the intake throttle device 3 so that the target TM input torque can be obtained by a known technique. Further, the speed ratio of the CVT 12 is controlled to achieve the target TM input rotation speed.

In the above process, the target TM input rotation speed computation part 53 computes the target TM input rotation speed by limiting the lower limit of the target TM input rotation speed basic value by the target TM input minimum rotation speed basic value, the minimum TM input rotation speed limiting value and the highest mode TM input rotation speed and limiting the upper limit of the target TM input rotation speed basic value by the lowest mode TM input rotation speed and the maximum rotation speed limiting value. That is, limits based on function requests of the internal combustion engine 1, the CVT 12 and noise vibration suppression are added together with the limit by the target TM input minimum rotation speed basic value.

Referring to FIG. 25, as a result of the processing by the target TM input rotation speed computation part 53, the target input rotation speed of the CVT 12 is limited by the target TM input minimum rotation speed in a low output region including during deceleration. Thus, the rotation speed of the internal combustion engine 1 does not drop to or below a fixed level in the low output region including during deceleration.

Figure 12:
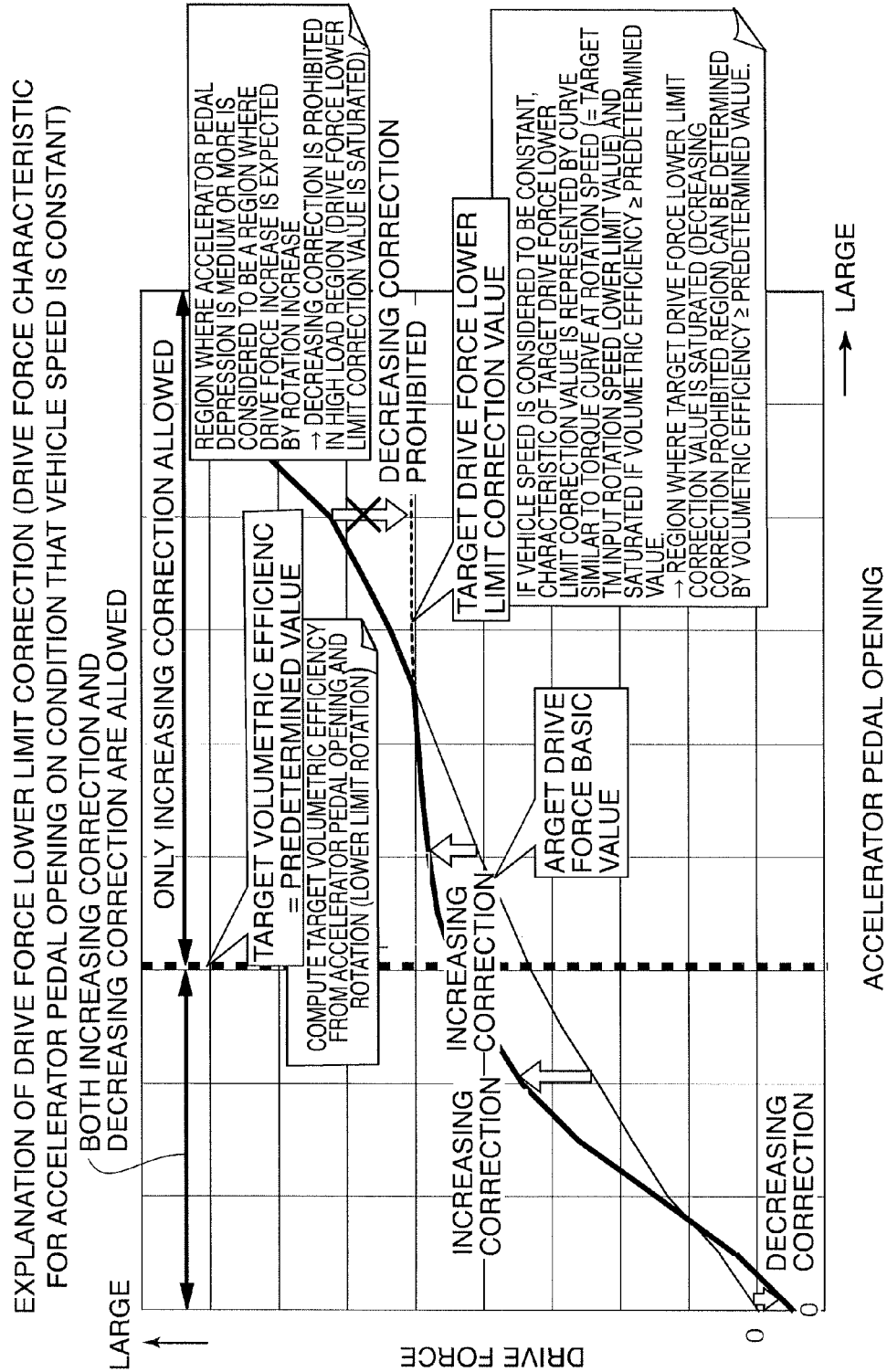
FIG. 12 is a diagram showing an example of a drive force correction realized by the drive force control device.

By the above control according to this invention, it becomes possible to arbitrarily correct the relationship of the accelerator pedal opening and the vehicle drive force also in the PTD control. As a result, as shown in FIG. 12, a favorable response of the drive force to the accelerator pedal operation can be realized by performing only the increase correction of the drive force at the accelerator pedal opening larger than a threshold value determined based on the volumetric efficiency and performing both the increase correction and the decrease correction of the drive force at the accelerator pedal opening not larger than the threshold value.

As described above, according to this drive force control device, drive force manipulation by increasing the rotation speed as in the ETD control can be realized also in the PTD control. Specifically, an improvement of a response of a drive force change to an increase of the input rotation speed is realized by correcting the lower limit rotation speed of the input rotation speed to the CVT 12. In this way, a function request such as the sport mode can be satisfied without causing the actual drive force to deviate from the target drive force.

This drive force control device further computes the target drive force lower limit correction value based on the target input rotation speed lower limit value and the accelerator pedal opening. Thus, a drive force change as expected by the driver can be realized by the operation amount of the accelerator pedal and an increase of the input rotation speed.

Further, this drive force control device computes the target input torque lower limit correction value based on the target input rotation speed lower limit value and the accelerator pedal opening and computes the target drive force lower limit correction value based on the target input torque lower limit correction value. That is, since the target input torque is determined based on the input rotation speed and the accelerator pedal opening, a torque characteristic as in the ETD control can be easily and properly realized and such a drive force change as not to give any sense of incongruity to the driver can be realized.

Furthermore, this drive force control device determines whether or not the basic drive force is to be increase corrected and determines whether or not the basic drive force is to be decrease corrected. This enables the drive force to be increase corrected only or to be decrease corrected only, if necessary. For example, a control to correct only the drive force at the time of engine braking becomes possible and a degree of freedom in controlling drivability is improved.

Furthermore, this drive force control device is configured to determine based on the target drive force lower limit correction value whether or not to correct the lower limit value of the target drive force, and correct the target drive force based on a determination result. As a result, the correction of the target input rotation speed lower limit value and the drive force change associated therewith can be independently controlled. For example, the extra drive force can be manipulated only by increasing the input rotation speed.

Furthermore, this drive force control device is configured to compute the target volumetric efficiency lower limit correction value based on the target input rotation speed lower limit value and the accelerator pedal opening and determine based on the target volumetric efficiency lower limit correction value whether or not the basic drive force is to be increase corrected. For example, drivability is possibility impaired, for example, if the decrease correction is performed in a high load region. Such a region where the decrease correction of the drive force should not be performed can be easily and properly determined by this configuration.

The contents of Tokugan 2012-134052, with a filing date of Jun. 13, 2012 in Japan, are hereby incorporated by reference.

Although this invention has been described above with reference to a certain embodiment, this invention is not limited to the embodiment described above. Modifications and variations of the embodiment described above will occur to those skilled in the art, within the scope of the claims.

The embodiments of this invention in which an exclusive property or privilege is claimed are defined as follows:

1. A drive force control device for a vehicle with an automatic transmission, comprising:
    a first sensor that detects an accelerator pedal opening;
    a second sensor that detects a vehicle speed; and
    a programmable controller programmed to:
        compute a target drive force according to the accelerator pedal opening;
        compute a target input rotation speed lower limit basic value to the automatic transmission based on the vehicle speed and a shift range of the automatic transmission;
        compute a target drive force lower limit correction value based on the target input rotation speed lower limit basic value;
        correct the target drive force based on the target drive force lower limit correction value;
        compute a target input torque of the automatic transmission based on the target drive force after correction; and
        control an input torque to the automatic transmission to the target input torque.

2. The drive force control device according to claim 1, wherein the controller is further programmed to compute a target input minimum rotation speed by correcting the target input minimum rotation speed basic value based on the vehicle speed and compute the target drive force lower limit correction value based on the target input minimum rotation speed.

3. The drive force control device according to claim 2, wherein the controller is further programmed to compute a target input rotation speed basic value from the target drive force and the vehicle speed, compute a target input rotation speed to the automatic transmission by correcting the target input rotation speed basic value according to the target input rotation speed lower limit basic value and the vehicle speed and control the input rotation speed to the automatic transmission to the target input rotation speed.

4. The drive force control device according to claim 2, wherein the controller is further programmed to compute the target drive force lower limit correction value based on the target input rotation speed lower limit value and the accelerator pedal opening.

5. The drive force control device according to claim 2, wherein the controller is further programmed to compute a target input torque lower limit correction value based on the target input rotation speed lower limit value and the accelerator pedal opening and compute the target drive force lower limit correction value based on the target input torque lower limit correction value.

6. The drive force control device according to claim 2, wherein the controller is further programmed to determine whether or not the target drive force is to be increase corrected and determine whether or not the target drive force is to be decrease corrected.

7. The drive force control device according to claim 6, wherein the controller is further programmed to determine based on the target input rotation speed lower limit value and the accelerator pedal opening whether or not to prohibit a decrease correction of the target drive force and prevent a correction to decrease the target drive force lower limit value when the decrease correction of the target drive force is prohibited.

8. The drive force control device according to claim 6, wherein the controller is further programmed to compute a target volumetric efficiency lower limit correction value based on the target input rotation speed lower limit value and the accelerator pedal opening and determine based on the target volumetric efficiency lower limit correction value whether or not the basic drive force is to be decrease corrected.

9. A drive force control method for a vehicle with an automatic transmission, comprising:
   detecting an accelerator pedal opening;
   detecting a vehicle speed;
   computing a target drive force according to the accelerator pedal opening;
   computing a target input rotation speed lower limit basic value to the automatic transmission based on the vehicle speed and a shift range of the automatic transmission;
   computing a target drive force lower limit correction value based on the target input rotation speed lower limit basic value;
   correcting the target drive force based on the target drive force lower limit correction value;
   computing a target input torque of the automatic transmission based on the target drive force after correction; and
   controlling an input torque to the automatic transmission to the target input torque.

10. A drive force control method for a vehicle with an automatic transmission, comprising:
   means for detecting an accelerator pedal opening;
   means for detecting a vehicle speed;
   means for computing a target drive force according to the accelerator pedal opening;
   means for computing a target input rotation speed lower limit basic value to the automatic transmission based on the vehicle speed and a shift range of the automatic transmission;
   means for computing a target drive force lower limit correction value based on the target input rotation speed lower limit basic value;
   means for correcting the target drive force based on the target drive force lower limit correction value;
   means for computing a target input torque of the automatic transmission based on the target drive force after correction; and
   means for controlling an input torque to the automatic transmission to the target input torque.

* * * * *